US012273274B2

(12) United States Patent
Thyagaturu et al.

(10) Patent No.: US 12,273,274 B2
(45) Date of Patent: Apr. 8, 2025

(54) NETWORK FLOW-BASED HARDWARE ALLOCATION

(71) Applicant: Intel Corporation, Santa Clara, CA (US)

(72) Inventors: Akhilesh Thyagaturu, Tempe, AZ (US); Hassnaa Moustafa, Portland, OR (US); Lavanya Gubbala, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 17/358,817

(22) Filed: Jun. 25, 2021

(65) Prior Publication Data

US 2021/0328933 A1  Oct. 21, 2021

(51) Int. Cl.
*H04L 12/851* (2013.01)
*H04L 12/26* (2006.01)
*H04L 43/0876* (2022.01)
*H04L 47/24* (2022.01)

(52) U.S. Cl.
CPC .......... *H04L 47/24* (2013.01); *H04L 43/0876* (2013.01)

(58) Field of Classification Search
CPC .................. H04L 47/24; H04L 43/0876
USPC .......................................................... 709/224
See application file for complete search history.

(56) References Cited

U.S. PATENT DOCUMENTS

| | | | | |
|---|---|---|---|---|
| 11,663,219 B1* | 5/2023 | Profirovic | ........... | G06F 16/2457 |
| | | | | 707/713 |
| 2015/0163162 A1* | 6/2015 | DeCusatis | ........... | H04L 41/0895 |
| | | | | 709/224 |
| 2018/0262413 A1* | 9/2018 | Sureka | ................ | H04L 43/0876 |
| 2019/0068464 A1* | 2/2019 | Bernat | ............... | H04L 41/5025 |
| 2019/0356728 A1* | 11/2019 | Devilbiss | ............ | H04L 67/1008 |
| 2020/0241999 A1* | 7/2020 | Guim Bernat | ...... | G06F 11/3419 |
| 2022/0027249 A1* | 1/2022 | Dua | .................... | G06F 11/3466 |

OTHER PUBLICATIONS

"A survey of subscription privacy on the 5G radio interface-the past, present and future", Journal of Information Security and Applications 53, (2020), 20 pgs.
Ahuja, Kiran, "Network selection criterion for ubiquitous communication provision in smart cities for smart energy system", Journal of Network and Computer Applications 127, (2019), 82-91.

(Continued)

*Primary Examiner* — Ruolei Zong
(74) *Attorney, Agent, or Firm* — Schwegman Lundberg & Woessner, P.A.

(57) ABSTRACT

System and techniques for network flow-based hardware allocation are described herein. A workload for is obtained for execution. Here, the workload includes a flow that has a processing component and a network component. Then, during execution of the workload, the flow is repeatedly profiled and assigned a network service and a processing service during a next execution based on a network metric and a processing metric obtained from the profiling.

24 Claims, 17 Drawing Sheets

(56) References Cited

OTHER PUBLICATIONS

Brown, Gabriel, "Huawei and Heavy Reading Release the White Paper for 5G Core Network Service-Based Architecture", A Heavy Reading white paper produced for Huawei TechnologiesCo. Ltd. Online verfügbar unter [Online]. Retrieved from the Internet: URL: : https: www. huawei. com en press-events news 2017 11 HeavyReading-WhitePaper-5G-Core-Network, (2017), 3 pgs.

Chhajer, Shreyansh, "Hardware Accelerations for Container Engine to Assist Container Migration on Client Devices", 2020 IEEE International Symposium on Local and Metropolitan Area Networks, (2020), 6 pgs.

Prateek Shantharama, Prateek, "Hardware-Accelerated Platforms and Infrastructures for Network Functions: A Survey of Enabling Technologies and Research Studies", Computer Science, (2020), 65 pgs.

Ylitalo, Jukka, "Dynamic network interface election in multihomed mobile hosts", 36th Annual Hawaii International conference on System Sciences Proceeding of the IEEE, (2003), 11 pgs.

\* cited by examiner

NEW SESSION REQUEST NEEDS TELEMETRY OF NETWORK RESOURCES REQUIREMENT BASED ON PLATFORM REQUIREMENTS AND AVAILABILITY

| NETWORK BANDWIDTH |
| LATENCY (AVG., MIN, MAX) POWER SPENT FOR TX/RX |
| RELIABILITY |
| ... |

E.G., NETWORK RESOURCE CONSTRAINTS (EXPECTATION)

NEW SESSION REQUEST NEEDS TELEMETRY OF PLATFORM RESOURCES REQUIREMENT

| POWER AVAILABILITY |
| CPU (PROC.) AVAILABILITY MEMORY AVAILABILITY |
| OS SCHED. REQUIREMENTS |
| ... |

E.G., PLATFORM RESOURCE CONSTRAINTS (AVAILABILITY)

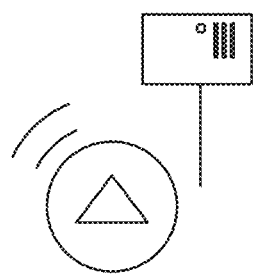

E.G., STREAMING SERVICE APPLICATION

FIG. 3

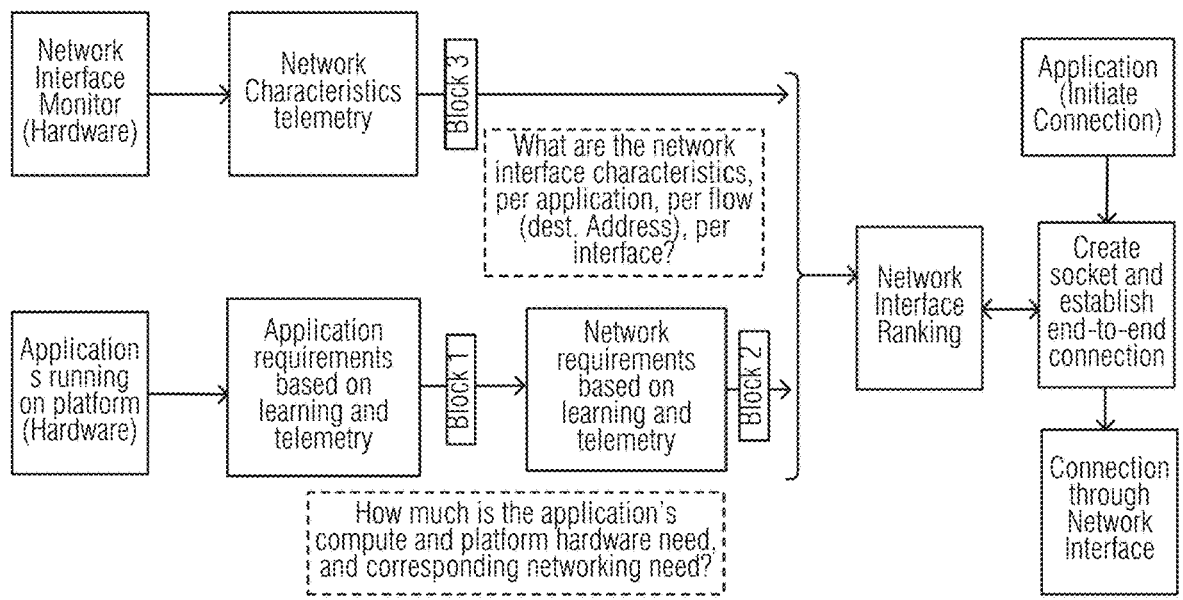
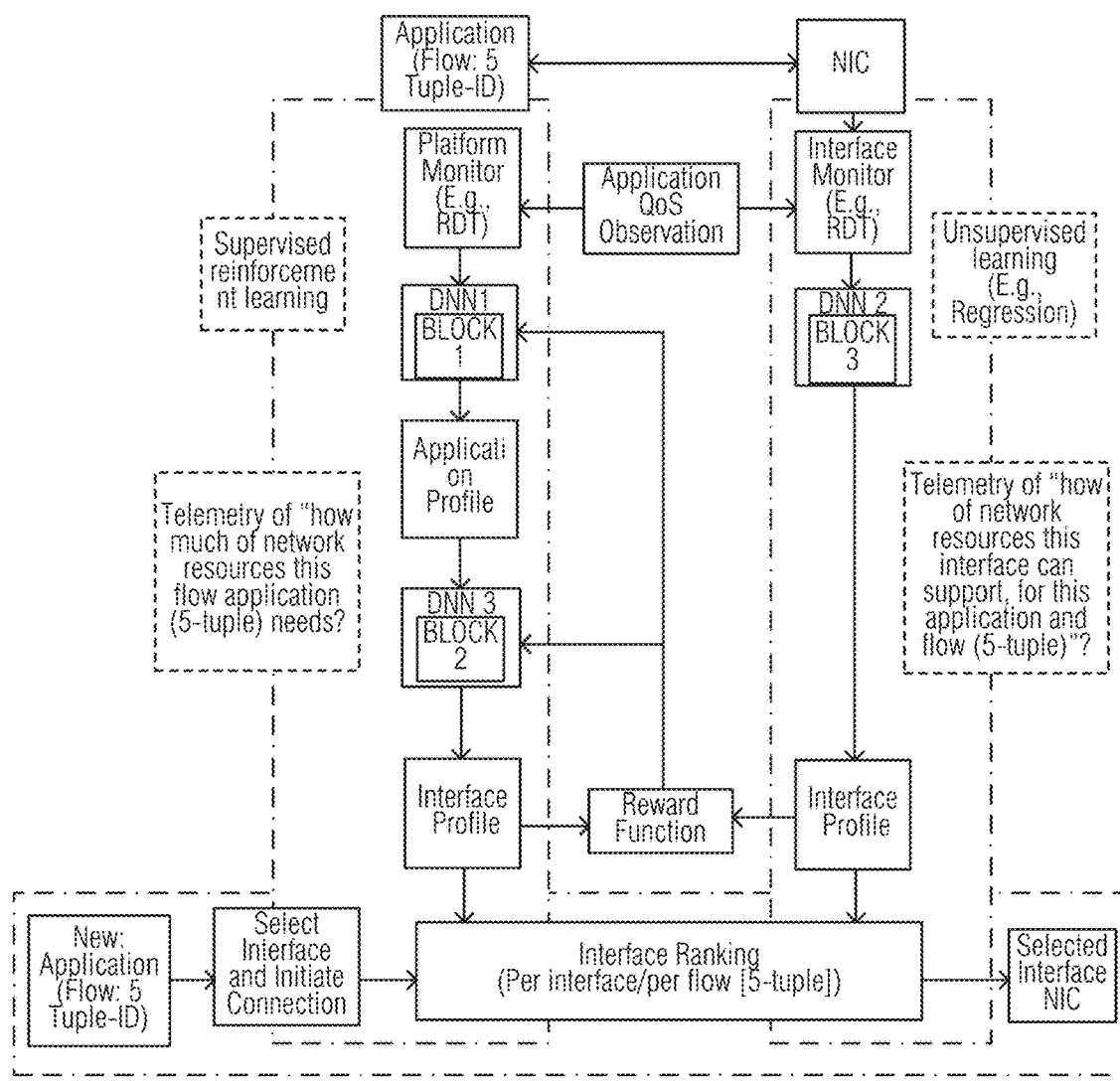
FIG. 5

NETWORK FLOW-BASED HARDWARE ALLOCATION

TECHNICAL FIELD

Embodiments described herein generally relate to computer hardware partitioning and more specifically to network flow-based hardware allocation.

BACKGROUND

Edge computing moves data and processing capabilities closer to consumers of these services. Edge platforms provide storage and processing at locations that are physically close to client devices. Examples of edge locations may include within homes or businesses (e.g., as part of a router or other networking device), at roadside units (RSUs) to support vehicle services, or in cellular base stations, among other places. Due to the numbers and varied locations of edge computing platforms, there is a tendency towards resource constraint in terms of storage, processing capabilities, and power. Edge platforms often include mechanisms to host a variety of services, often from unrelated vendors, such as hardware and software enforced partitioning of resources.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of network characteristic association, according to an embodiment.

FIG. 5 illustrates an example of real-time learning and telemetry, according to an embodiment.

DETAILED DESCRIPTION

Figure 1:
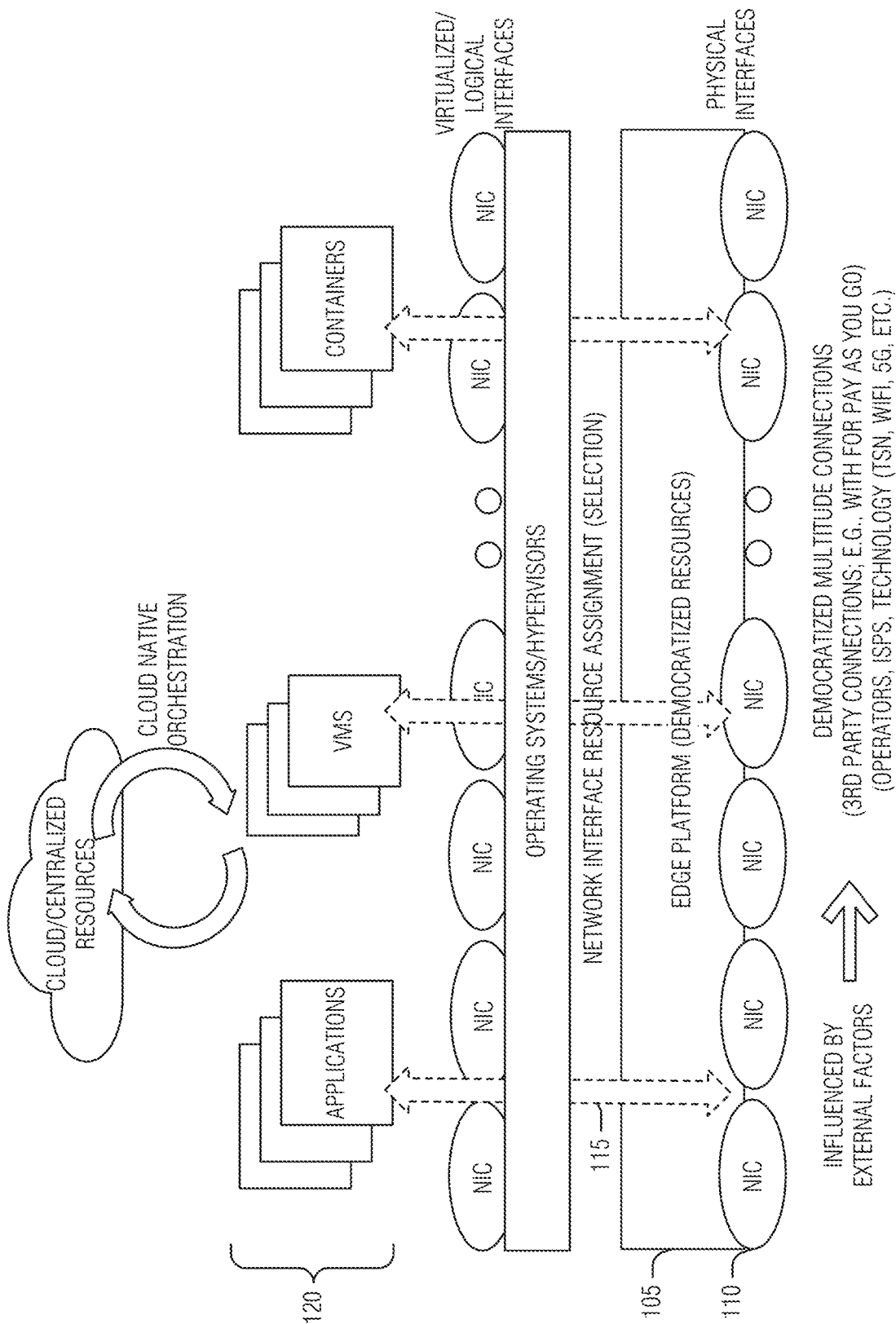
FIG. 1 is a block diagram of an example of an environment including a system for network flow-based hardware allocation, according to an embodiment.

Edge platforms are transitioning towards a democratized hardware approach. Here, no single entity controls the platform resources. Rather, services (e.g., workloads) negotiate resource use, resulting in a fair and decentralized distribution of the edge platform resources. Connectivity in such platforms is diverse, highly configurable, and, on many occasions, asynchronous with respect to workload execution. In traditional implementations, connectivity is assigned to services in a static (e.g., unchanging) manner when multiple connectivity technologies—such as those that comply with an IEEE 802.11 family of standards, cellular standards, ethernet, optical connectivity, etc.—are available.

As edge computing starts to observe increase deployment with the third generation partnership project (3GPP) 5G family of standards and with the growth in Internet of Things (IoT) services that fuel the need for edge computing, there is a need for this resource democratization to form an effective edge cloud infrastructure with edge platforms belonging to multiple tenants (e.g., telecommunication companies, content service providers (CSPs), or other service providers) and offering edge cloud capabilities to host multi-tenant applications from diverse independent software vendors (ISVs) and service providers. With the emergence of the democratized edge, a fixed assignment of resources to virtual machines (VMs), containers, or applications in a cloud native fashion is inefficient.

Further, fixed assignment of network services (e.g., network interfaces whether physical or virtual) is inefficient and often interferes with service level agreement (SLA) compliance. To address these issues, an intelligent framework is used that learns the resource (e.g., processing or network) characteristics of workload flows, negotiates the services with service providers (e.g., 5G services, ultra-high bandwidth, ultra-low latency, etc.), and negotiates the processing resources (e.g., hardware acceleration, frequency of operation, storage, etc.) within the democratized edge platforms to support dedicated network flows for each workload in a dynamic manner. This enables workloads to negotiate optimal network services for connection initiation in real-time and to update the network service as needed.

The systems and techniques described herein differ from other approaches to address similar issues. For example, the present approach uses an intelligent framework to select network services that learns workload traffic flow characteristics and performs network service negotiation before the workloads (e.g., applications, executable programs, VMs, containers, etc.) are instantiated. This approach address edge platform connectivity and not necessarily end-user devices (e.g., user equipment (UE)) with multiple network connectivity options. Rather, the intelligent framework provides resource estimation to support workloads, reconfigure hardware, and facilitate negotiation of the network service—such as Ultra-Reliable Low Latency Communications (URLLC), Enhanced Mobile Broadband (EMBB), etc.—with the service providers (e.g., operators for 5G connectivity). In contrast, UE device techniques may select between different radio technologies to maximize, for example speed or power savings, but these devices generally do not have multiple tenants competing for throughput as is the case in edge platforms.

Another aspect that differentiates the present approaches with the UE communications addresses the nature of the problem being addresses. Typically, single tenant devices, such as the UE, attempt to maximize performance for the single tenant. This, protocols to facilitate this performance enhancement, such as multipath, may track communications through a network to ascertain bandwidth and latency optimizations between a source and destination over multiple links. However, these techniques usually require technique aware protocols such as Multipath-TCP, and hence require prior knowledge. Multipath is used to effectively manage communications over multiple links between source and destination devices. However, the techniques described herein address a different issue; which workloads are assigned to which network services. Thus, the present techniques make an informed selection of services for workloads out of many options. For instance, when a VM requires two independent physical network connections on the edge node that has eight network interfaces, which two of these network interfaces should be selected for the VM? Also, the situation becomes more complicated when these eight network interfaces change operating characteristics based on negotiation with their respective service providers. These types of selection decisions are not performed by current approaches.

In many democratized edge platforms, the network services are democratized such that there is no specified QoS assignment. Thus, there may be multitude of connections offering various QoS services. Hence, the intelligent framework may include a negotiation agent, learning component, or assignment framework to meet workload demands. Generally herein, network interface that can meet the workload demands for the lowest cost in a given duration is synonymous with as the "best" interface.

The following scenarios illustrate a few edge platform challenges and the subsequent operation of the intelligent framework to address these challenges. Consider session based requests. Here, network flows for workloads in the cloud and at the edge may be dominated by hypertext transfer protocol (HTTP) or HTTP Secure (HTTPS) connections. HTTPS session initiation is often the most commonly used workload that benefits from dynamic interface selection because the connection establishment is frequent, short lived, and operates over multiple five-tuple flow IDs, each flow ID being independent for each session. The intelligent framework negotiates, reconfigures platform resources, and selects the best interface before each end-to-end HTTP or HTTPS connection is established based on session requirements for workloads.

Consider microservice deployments. Here, when a VM or container is deployed on an edge platform, the operating system (OS) or the hypervisor has to determine which network interfaces to select for a given workload. The edge platform does not have the same service set availability for network interfaces as in the cloud or data center infrastructures. Traditionally, these network selections are static, and pre-configured. The intelligent framework described herein dynamically selects the optimal set of physical network interfaces to meet the requirements of the VMs or containers based on their workload requirements and network behavior learned by the intelligent framework.

Consider Pay-as-you-consume models for democratized edge platforms. Here, whenever a workload requests a network interface with dedicated service, and offers remuneration the network dedicated service, the intelligent framework enables the application to negotiate for the service. The intelligent framework selects the network interface that enables the service to be negotiated during runtime, and also reconfigure the platform to support the network flow with dedicated platform resources. Additional details and examples are provided below.

FIG. 1 is a block diagram of an example of an environment including a system for network flow-based hardware allocation, according to an embodiment. As illustrated, workloads 120 (e.g., applications, VMs, containers, etc.) have flows 115 that operate over network services 110 (e.g., a network interface card (NIC)) managed by the edge platform 105.

The edge platform 105 includes computer readable media containing instructions that, when executed by processing circuitry of the edge platform, implement the intelligent framework. Thus, the instructions configure the processing circuitry to obtain a workload 120 for execution. The workload 120 may be obtained in any number of ways, although typical approaches include receipt of a request to instantiate the workload—be it an application, VM, container, microservice, or other workload—or a schedule. Common to the workloads 120 here is the presence of a flow 115. In this context, a flow 115 is a processing pipeline that includes a network communication. The scope of a flow 115 may vary. For example, a flow 115 may encompass a single stateless HTTP transaction, as is common in serving a web page or performing a microservice call. In an example, a flow 115 may encompass the entirety of an application's execution, or the entirety of a single session throughout an application's execution that may include several sessions. In an example, the scope of all flows 115 are the same across workloads 120, such that, for example, each flow 115 is session based or each flow 115 is network request based.

Also common to the flows 115 is a combined processing component and network component. Thus, each flow 115 entails the use of some processing hardware—such as central processing unit (CPU) time, accelerator (e.g., graphic processing unit (GPU), field programmable gate array (FPGA), artificial intelligence (AI) processor (e.g., a neuromorphic processor)) time, state memory (e.g., random access memory RAM), storage (e.g., hard drive, solid state storage, etc.), etc.—to produce data that is transmitted to another device through a network service 110.

The processing circuitry is configured to execute the workload 120. During workload 120 execution, the intelligent framework observes the use of the assigned processing and network resources 110, recording the results, and applying the usage data to adjust processing and network resource 110 selection during the current workload 120 execution or during a next execution of the workload 120. This profiling and adjustment repeats during workload 120 execution.

Thus, the processing circuitry is configured to profile a flow 115 to determine a network metric for the network component and a processing metric for the processing component. Here, the network metric may include any of timing of use, bandwidth consumed, latency experienced, dropped packets, or other network metrics with regard to performance of the network service 110. Similarly, the processing metric may be any of CPU or accelerator use (e.g., power consumed, time in idle, percent of cores used), memory use, storage use, etc. The metrics will be used to determine whether the processing or network service 110 is "right-sized" to the workload 120. An ideal being that the workload 120 requirements for speed, latency, bandwidth, etc. are met without oversubscribing processing or network resources. Thus, a network metric indicating that less bandwidth is used (e.g., because the receiving device cannot handle more) than is available or is processed by the processing service indicates that the workload 120 may be assigned fewer processing resources and a slower network interface without a problem.

In an example, the profiling is performed at a predefined time interval. Thus, while the workload 120 is executing, a measurement of the network metric or the processing metric is taken and recorded. In an example, the profiling is performed in response to an event. For example, the event may include contention on a resource, a threshold of waiting workloads 120 being exceeded, etc. In an example, the profiling is performed, or upon receipt of a query concerning the flow 115 or the workload 120.

In an example, the profiling includes tagging a communication of the flow 115 using the network service 110 with an identification. Here, the ID tag enables the profiler to track different activities of the flow 115 in order to correlate these activities. Thus, the identification may be mapped to the flow 115. In an example, the identification is a tuple that includes a source address, a source port, a destination port, or communication type. This ID reflects the connection-based orientation of the network component of the flows 115.

Figure 4:
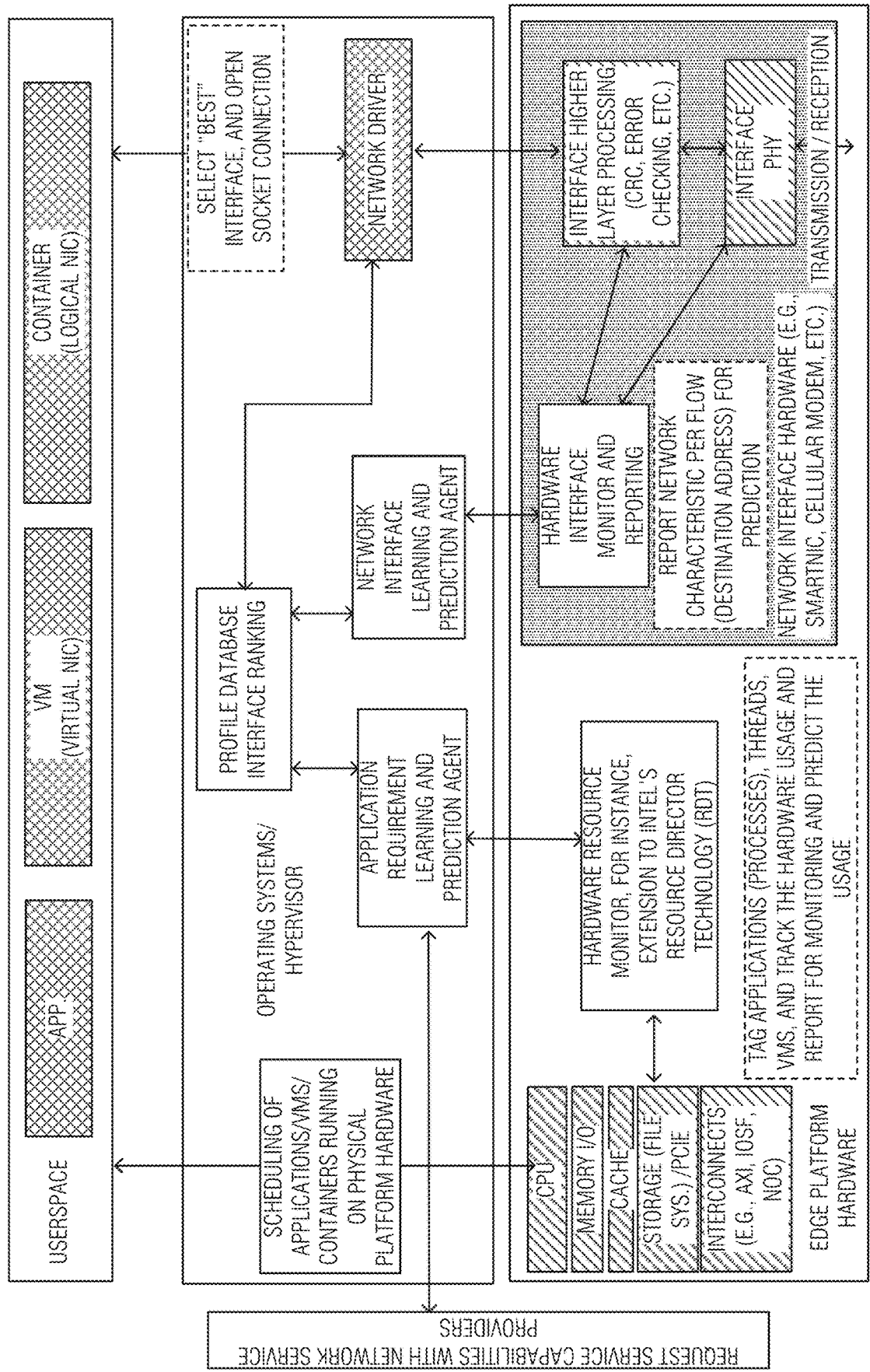
FIG. 4 illustrates an example of learning agents for network service and processing service assignment, according to an embodiment.

In an example, the profiling updates an interface profile and ranking database. Recording the profiling metrics enables their processing for the subsequent assignment of services to the workload 120. In an example, an entry in the interface profile and ranking database is thirty-bits in length. In an example, interfaces are ranked in the interface profile and ranking database by flow. Here, assigning the network service 110 and the processing service to the flow 115 in a next execution based on the network metric and the processing metric includes selecting an interface with a highest rank for the flow 115. In an example, the interfaces are ranked based on a combination of the flow 115 and a processing service selected for the flow 115. The tables provided below in the discussion of FIG. 4 illustrate an example of such a database and ranking.

The processing circuitry is configured to assign a network service 110 (e.g., network interface whether physical or virtual) and a processing service to the flow 115 in a next execution based on the network metric and the processing metric. Here, the next execution may include the next instantiation of the workload 120, the next operation (e.g., instruction, connection, etc.) during a current instantiation of the workload 120, or anything in-between. The recorded metrics enable the intelligent framework to track flow-to-resource allocation performance as the workload 120 executes. Thus, the multiple factors attributable to the network 110 and processing services are correlated to flow 115 performance. The intelligent framework may then match a next flow to those services that meet the flow 115 requirements. In an example, the processing circuitry is configured to assign the network service 110 by selecting a network service 110 that includes a minimum network metric to meet the network component of the flow 115. In an example, the network metric is bandwidth or latency.

In an example, the processing circuitry is configured to assign the network service 110 and the processing service by selecting a network service 110 that includes a minimum network metric to meet a maximum output related to the network metric of the processing service. Here, the problem of oversubscribing a network service 110 to a less capable processing service is addressed. Thus, if the workload 120 is assigned a processing service that is only capable of one-megabit-per-second (1 Mbps) output, assigning a 1 gigabit-per-second (1 Gbps) network interface to the flow is wasteful and avoided. Rather, matching the processing service output capability to the network service 110 output capability is generally the most efficient.

Figure 2:
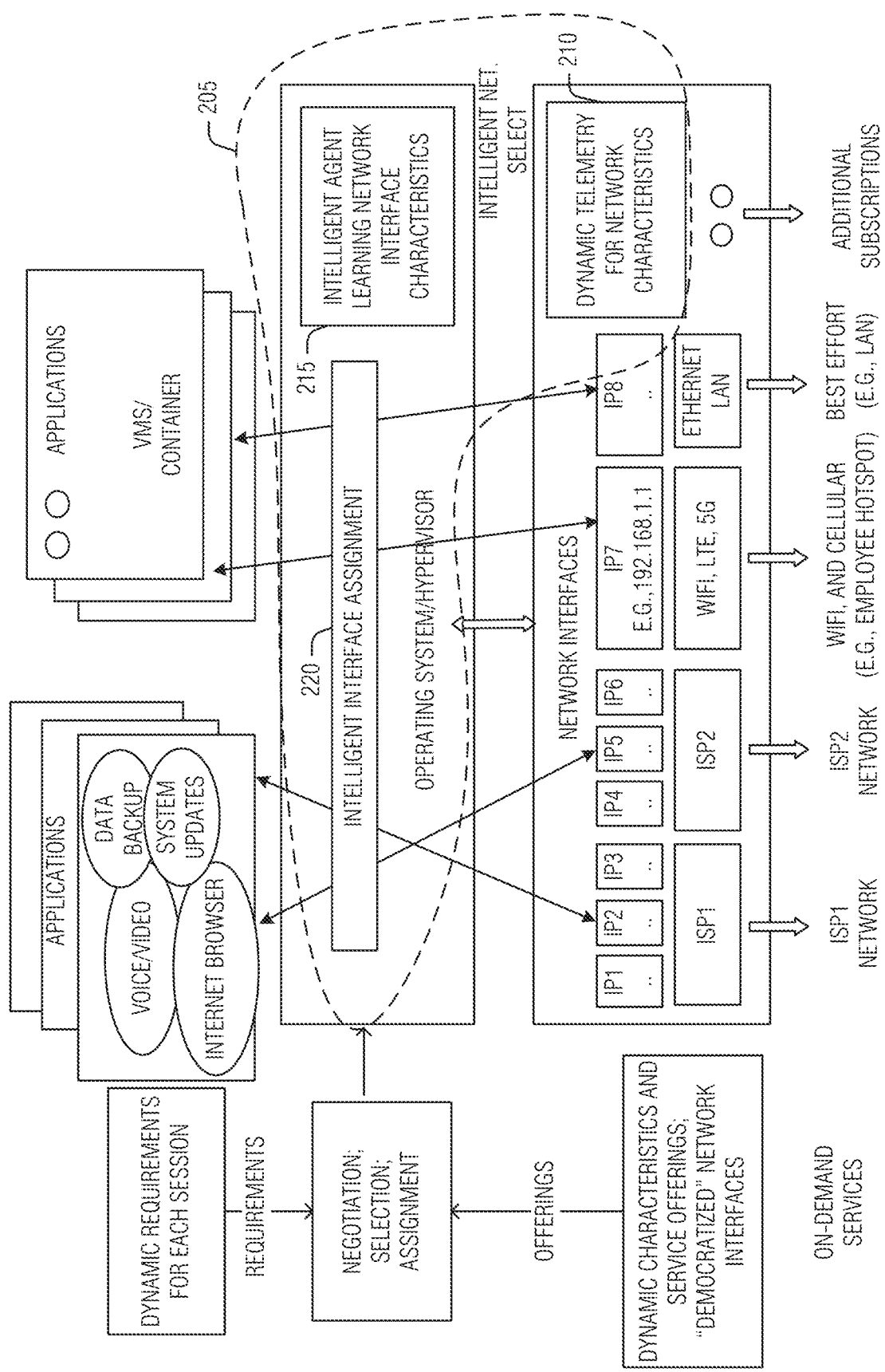
FIG. 2 illustrates an example architecture, according to an embodiment.

FIG. 2 illustrates an example architecture, according to an embodiment. The architecture hosts workloads, such as applications, virtual machines, containers, etc. to provide a variety of services, such as voice or video processing, storage, or delivery; data storage (e.g., caching, backup, etc.); or other edge services.

The architecture includes a management component, such as an operating system of hypervisor, to provide hardware to the hosted workloads. The hardware, as illustrated, includes a variety of interfaces (illustrated as IP1-IP8) for a variety of physical media, such as wired or wireless service provider networks (e.g., frame relay physical connections, illustrated as ISP1-ISP2), wireless radio media, wired ethernet, etc.

The illustrated boxes on the left illustrate that the network interface hardware are services that may be offered to the workloads. The workloads have requirements, and the intelligent framework matches these requirements with the offerings. The dashed line illustrates the intelligent framework 205 in the edge platform. The intelligent framework includes a telemetry agent 210, a learning agent 215, and an assignment agent 220. In operation, the intelligent framework 205 assigns the network interfaces to VMs, containers, or application based on their requirements and learned characteristics. The intelligent framework enables the application to request, and change, as well as operate by exploiting pay-as-you-go models to dynamically gain the network interface capabilities.

FIG. 3 illustrates an example of network characteristic association, according to an embodiment. Platform resource telemetry operates with network characteristic telemetry to meet quality-of-service (QoS) and service-level-agreement (SLA) specifications for workloads. Consider that the selected network interface with a large capacity is assigned to a workload and there are insufficient computing resources. This scenario results in a wasteful allocation of the network resources. Therefore, dynamic allocation of the network interface that is appropriate to meet the application requirements while considering the available compute resources is useful to avoid overprovisioning.

FIG. 4 illustrates an example of learning agents for network service and processing service assignment, according to an embodiment. With the illustrated components, each workload may transparently connect to the end-host via a network interface selected based on learning what connectivity is "the best" for the workload.

Platform resources are dynamically tracked and learned for a given workload, which is used for the prediction of how much of the networking resources may be "potentially" and "effectively" utilized. In an example, platform resources are learned based on tagging with IDs that are mapped to each flow with a five-tuple: Source IP: Destination IP: Source Port: Destination Port: IP Type [UDP, TCP]). The five-tuple flow ID is used to map the end-to-end connection because the network behavior may change between two different end-to-end (E2E) connections over the same interface.

The network characteristics reporting may be achieved in a number of ways. For example, through periodic reporting at a regular time interval, through event-based reactive reporting, or through on-demand query-based reporting.

The learned features extend to the end-to-end connectivity from platform to the back-end application. Such characteristics considered may include base station scheduling, cable modem, or optical network unit scheduling, gateways or switch behavior, among others.

The interface profile and ranking database tracks the features that are dynamically learned on the network characteristics and on the application requirements. An example of such a database is illustrated in the tables below. In an example, the representation of each entry in the database is around thirty two bits wide with a compact representation where a few MB of static memory cells in the DRAM (or persistent memory e.g., NAND of Intel platforms) that may be enumerated during the OS boot is enough to host a large number of flows for each application. In an example, the database is updated every two to three minutes. This rate does not increase the size of the database as new data overwrites the old data.

The learned features may be used to populate the Interface Ranking profile database. This database may be used to trigger the choice of the end-to-end connection for the applications.

The resolution of dynamic learning—e.g., the parameters across the inference—and ranking may be based on the five-tuple ID. Here, each five-tuple ID is unique across every network flow and interface. The intelligent framework may request the service providers (e.g., operators who provide the network connectivity) for service negotiation, and platform reconfiguration as needed by the workloads.

TABLE 1

Network Characteristics Profile Based on Learning and Estimation

| Application/VM/Container | ID1 | | ID2 | | ID3 | | |
|---|---|---|---|---|---|---|---|
| 5 tuple ID | Flow1 | Flow2 | . | Flow1 | Flow2 | . | Flow7 . |
| Bit [24 . . . 31] Reserved | . | . | . | 111 | . | . | . . |
| Bit [21 . . . 23] Cost/Byte | . | . | . | 110 | . | . | . . |
| Bit [18 . . . 20] Downlink Bandwidth | . | . | . | 110 | . | . | . . |
| Bit [15 . . . 17] Uplink Bandwidth | . | . | . | 100 | . | . | . . |
| Bit [12 . . . 14] Power Efficiency | . | . | . | 011 | . | . | . . |
| Bit [9 . . . 11] Jitter | . | . | . | 011 | . | . | . . |
| Bit [6 . . . 8] Average Delay | . | . | . | 011 | . | . | . . |
| Bit [3 . . . 5] Frame Loss | . | . | . | 0 | . | . | . . |
| Bit [1 . . . 2] Security | . | . | . | 100 | . | . | . . |
| Guaranteed Bit Rate | . | . | . | 1 | . | . | . . |

TABLE 2

Application Requirements Profile Based on Learning and Estimation

| Application/VM/Container | ID1 | | ID2 | | ID3 | | |
|---|---|---|---|---|---|---|---|
| 5 tuple ID | Flow1 | Flow2 | . | Flow1 | Flow2 | . | Flow7 . |
| Bit [24 . . . 31] Reserved | . | . | . | 111 | . | . | . . |
| Bit [21 . . . 23] CPU | . | . | . | 110 | . | . | . . |
| Bit [18 . . . 20] Memory | . | . | . | 110 | . | . | . . |
| Bit [15 . . . 17] Cache | . | . | . | 100 | . | . | . . |
| Bit [12 . . . 14] | . | . | . | 011 | . | . | . . |

TABLE 2-continued

Application Requirements Profile Based on Learning and Estimation

| Application/VM/Container | ID1 | | ID2 | | ID3 | | |
|---|---|---|---|---|---|---|---|
| 5 tuple ID | Flow1 | Flow2 | . | Flow1 | Flow2 | . | Flow7 . |
| DDR I/O | | | | | | | |
| Bit [9 . . . 11] Interconnect | . | . | . | 011 | . | . | . . |
| Bit [6 . . . 8] CPU Power | . | . | . | 011 | . | . | . . |
| Bit [3 . . . 5] Platform | . | . | . | 0 | . | . | . . |
| Bit [1 . . . 2] Security | . | . | . | 100 | . | . | . . |
| Guaranteed Bit Rate | . | . | . | 1 | . | . | . . |

TABLE 3

Network Interface Ranking

| Application/VM/Container | ID1 | | ID2 | | ID3 | | |
|---|---|---|---|---|---|---|---|
| 5 tuple ID | Flow1 | Flow2 | . | Flow1 | Flow2 | . | Flow7 . |
| Ranking | 111 | . | 0 | 111 | . | 0 | . . |

FIG. 5 illustrates an example of real-time learning and telemetry, according to an embodiment. The illustrated components demonstrate an example of telemetry, actions, and reward function for learning operations. This may be combined with FIG. 6 to implement a dynamic learning solution for the intelligent network interface selection.

Supervised reinforcement learning may be used to continuously learn the workload requirements. Unsupervised learning may be used to learn network interface characteristics to maximize the QoS for the workload through the selection of the appropriate network interface. More specifically, historical data of the application hardware platform resource usage may be used to estimate the network requirements (e.g., processing metrics or internal information), and generate Table 2 above.

The network characteristics may be learned from various factors to estimate the features described in Table 1 above. Inferences may be drawn from the physical layer (e.g., received signal strength, total power, etc.), or the network Itself—e.g., based on switches, gateways, or schedulers—to estimate the bandwidth allocation, latency, etc. for a workload. The scheduler or gateway information may be learned from the observed bandwidth and latency changes at the network interface for a given flow. For example, in a base station or cable model termination system, the scheduler prioritizes a particular traffic flow (e.g., to a video streaming service), which may be inferred by the learning agents.

Figure 6:
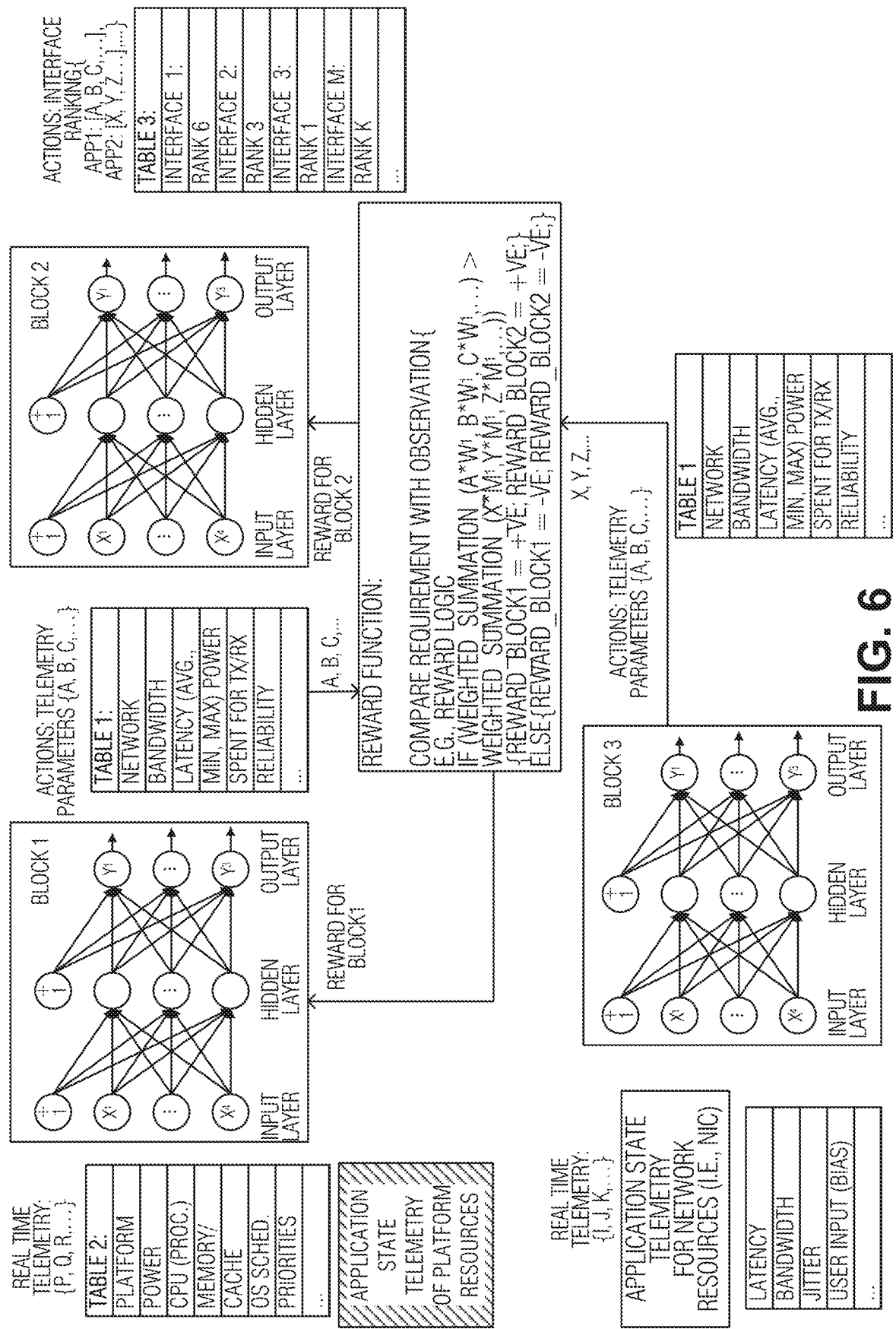
FIG. 6 illustrates an example of telemetry, actions, and reward for learning operations, according to an embodiment.

As shown in FIG. 6, the reward function may compare the actual application QoS requirements and provide the best interface selection to meet as many QoS requirements as possible.

FIG. 6 illustrates an example of telemetry, actions, and reward for learning operations, according to an embodiment. The illustrated neural network interactions with the input data (e.g., the flow, network service, and processing service database) and performance of a flow in a given configuration. The performance is used a punishment or reward to adjust rankings in the database. Thus, if a given combination of services for a flow performs poorly, the neural network is trained to reduce the ranking of the combination, ensuring that the combination is less likely to be selected for a next execution of the flow.

The reward-based reinforcement illustrated here is a form of unsupervised learning. Generally, in neural network learning (e.g., modification or training), a set of inputs is processed, an output is achieved, and a fitness function (e.g., error estimation) is computed. In traditional training techniques, the back-propagation technique is used to modify connection weights—which are often referred to as synapses although the nomenclature may vary—to both back the incorrect output less likely given the same inputs and a desired (e.g., correct) output more likely for those inputs on a future run. The degree to which the weights are modified is a design choice that has an impact on the speed and accuracy of convergence for the neural network.

In the reinforcement (e.g., reward) learning illustrated in FIG. 6, the reward function operates the determine the accuracy of the neural networks in block 1 and block 2 from the assessment of block 3. Thus, block 3 is a pretrained network that accepts the real-time telemetry of the application on a network interface and provides output (e.g., features, metrics, etc.) to the reward function. The reward function also accepts the outputs of block 1 (features or metrics of the application state on the processor service) and block 2 (the network service rankings given different classifications for the application on a processing service). Thus, the reward function compares the expected performance of the block 1 and block 2 outputs with the actual performance measured by block 3, and modifies the weights block 1 and block 2 accordingly. This arrangement provides continuous improvement to the intelligent agent performance, addressing changing conditions to meet actual performance between processing service and network service selection for workloads.

Figure 7:
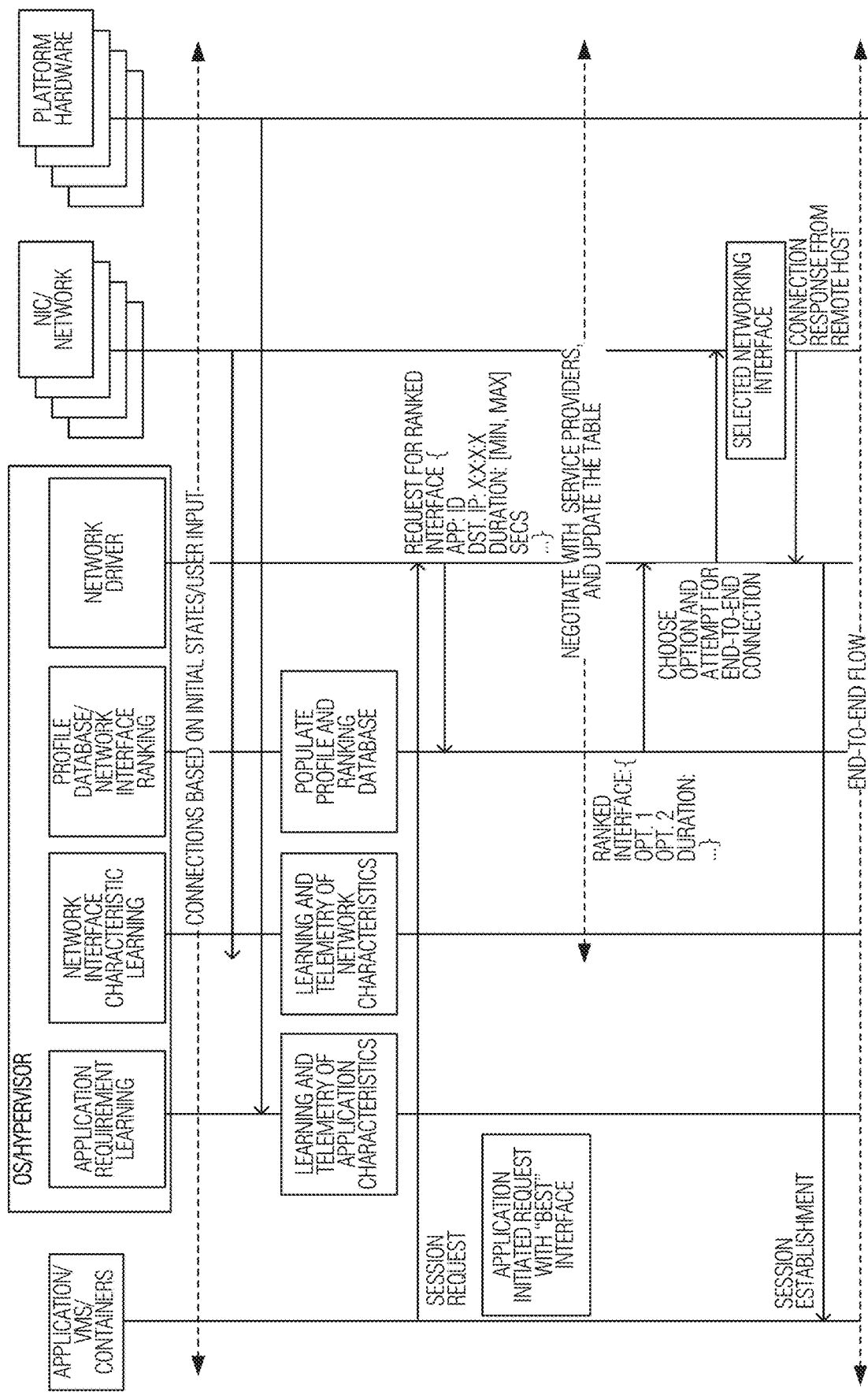
FIG. 7 illustrates an example of flow management, according to an embodiment.

FIG. 7 illustrates an example of flow management, according to an embodiment. The illustrated flow demonstrates an example of the interactions between the components discussed above. As illustrated, initial network service allocation may be performed based on provided metrics for a workload. The learning (e.g., artificial intelligence, statistical analytics, etc.) agents observe the performance of the workload through performance of workload flows through processing and network services. This results in ranked combinations of flows, processing services, and network services, enabling rapid selection of a processing or network service (or pair thereof) when a next execution of the flow is imminent.

Figure 8:
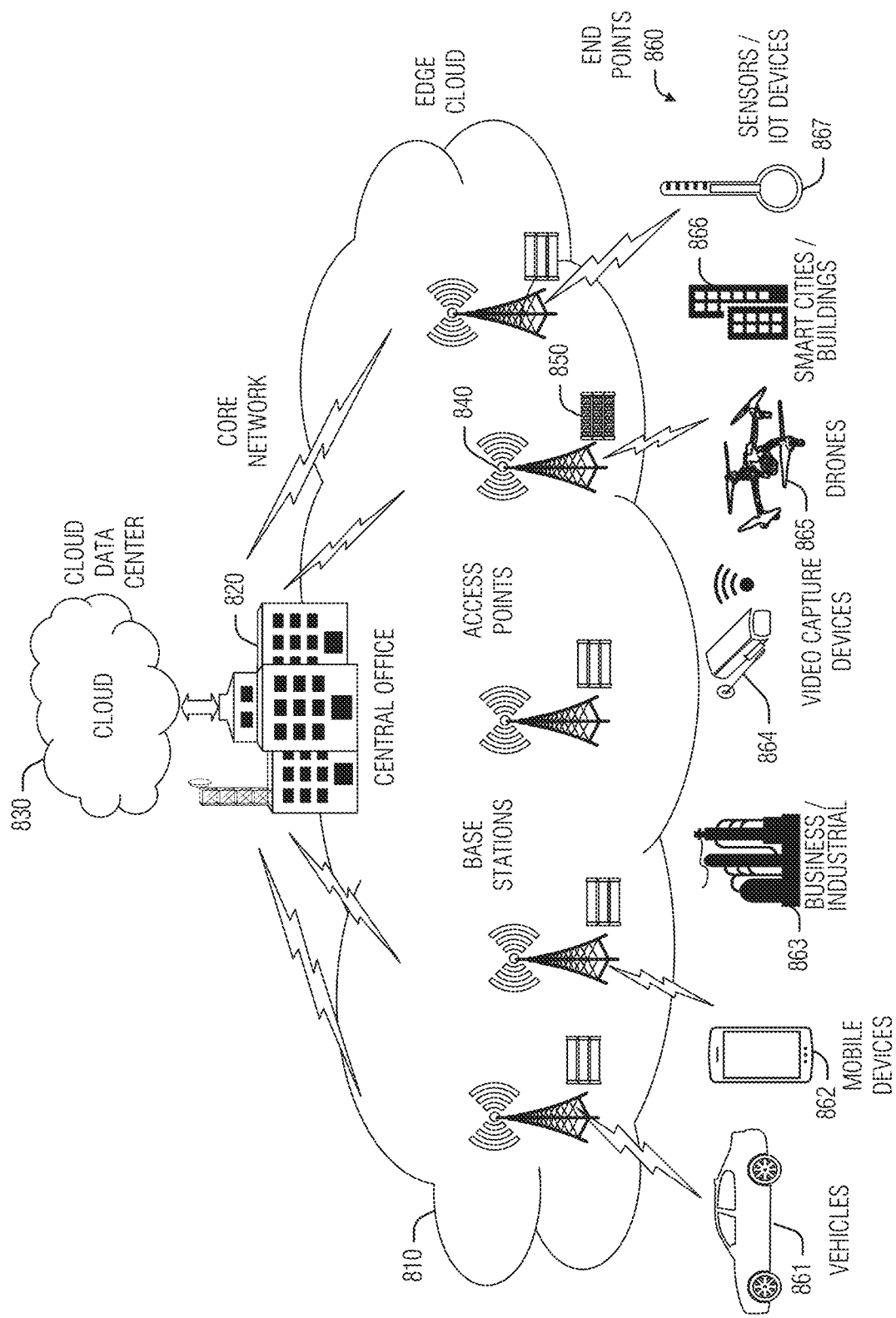
FIG. 8 illustrates an overview of an edge cloud configuration for edge computing.

FIG. 8 is a block diagram showing an overview of a configuration for edge computing, which includes a layer of processing referred to in many of the following examples as an "edge cloud". As shown, the edge cloud 810 is co-located at an edge location, such as an access point or base station 840, a local processing hub 850, or a central office 820, and thus may include multiple entities, devices, and equipment instances. The edge cloud 810 is located much closer to the endpoint (consumer and producer) data sources 860 (e.g., autonomous vehicles 861, user equipment 862, business and industrial equipment 863, video capture devices 864, drones 865, smart cities and building devices 866, sensors and IoT devices 867, etc.) than the cloud data center 830. Compute, memory, and storage resources which are offered at the edges in the edge cloud 810 are critical to providing ultra-low latency response times for services and functions used by the endpoint data sources 860 as well as reduce network backhaul traffic from the edge cloud 810 toward cloud data center 830 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 9:
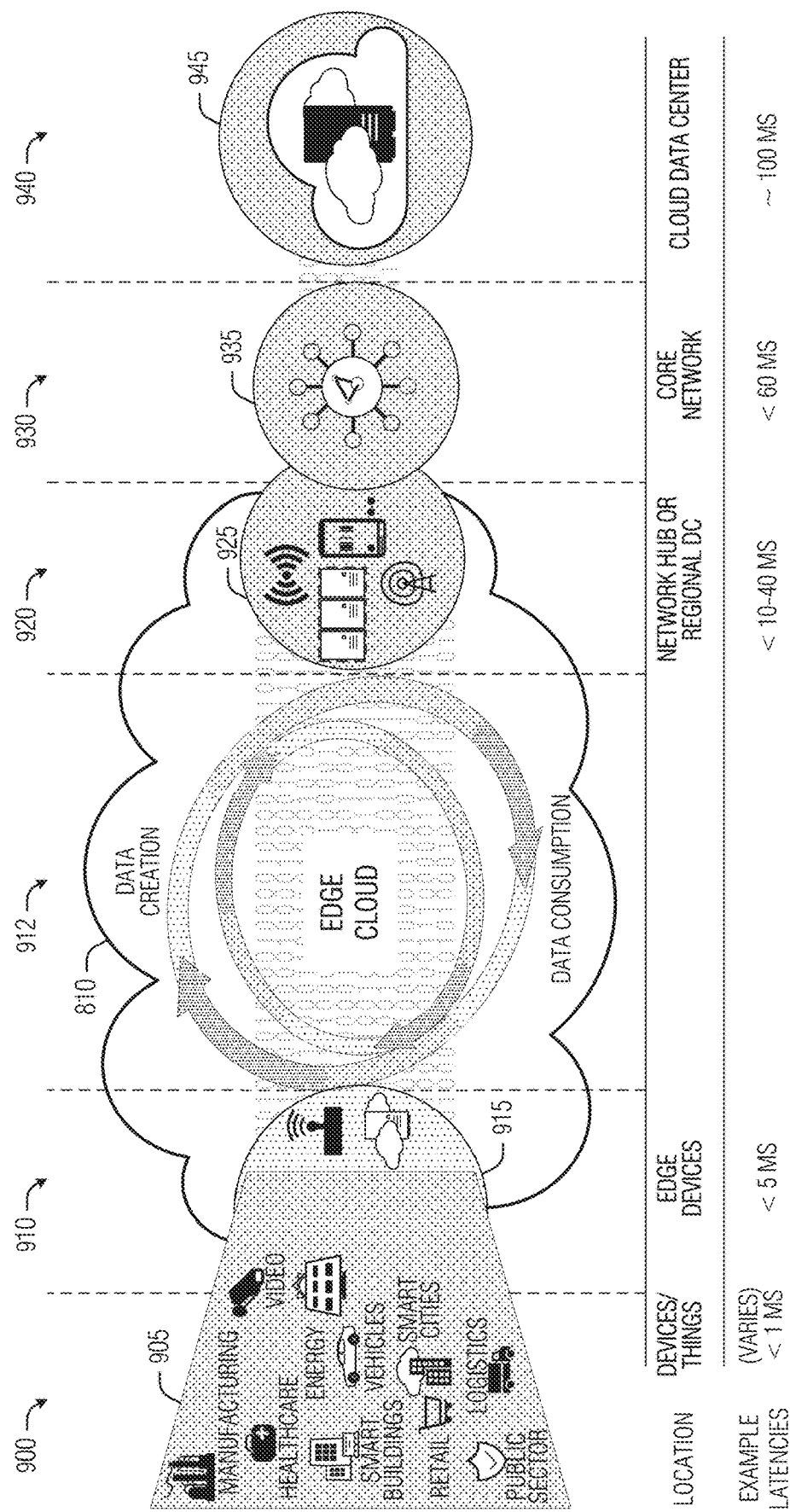
FIG. 9 illustrates operational layers among endpoints, an edge cloud, and cloud computing environments.

FIG. 9 illustrates operational layers among endpoints, an edge cloud, and cloud computing environments. Specifically, FIG. 9 depicts examples of computational use cases 905, utilizing the edge cloud 810 among multiple illustrative layers of network computing. The layers begin at an endpoint (devices and things) layer 900, which accesses the edge cloud 810 to conduct data creation, analysis, and data consumption activities. The edge cloud 810 may span multiple network layers, such as an edge devices layer 910 having gateways, on-premise servers, or network equipment (nodes 915) located in physically proximate edge systems; a network access layer 920, encompassing base stations, radio processing units, network hubs, regional data centers (DC), or local network equipment (equipment 925); and any equipment, devices, or nodes located therebetween (in layer 912, not illustrated in detail). The network communications within the edge cloud 810 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 900, under 5 ms at the edge devices layer 910, to even between 10 to 40 ms when communicating with nodes at the network access layer 920. Beyond the edge cloud 810 are core network 930 and cloud data center 940 layers, each with increasing latency (e.g., between 50-60 ms at the core network layer 930, to 100 or more ms at the cloud data center layer). As a result, operations at a core network data center 935 or a cloud data center 945, with latencies of at least 50 to 100 ms or more, will not be able to accomplish many time-critical functions of the use cases 905. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 935 or a cloud data center 945, a central office or content data network may be considered as being located within a "near edge" layer ("near" to the cloud, having high latency values when communicating with the devices and endpoints of the use cases 905), whereas an access point, base station, on-premise server, or network gateway may be considered as located within a "far edge" layer ("far" from the cloud, having low latency values when communicating with the devices and endpoints of the use cases 905). It will be understood that other categorizations of a particular network layer as constituting a "close", "local", "near", "middle", or "far" edge may be based on latency, distance, number of network hops, or other measurable characteristics, as measured from a source in any of the network layers 900-940.

The various use cases 905 may access resources under usage pressure from incoming streams, due to multiple services utilizing the edge cloud. To achieve results with low latency, the services executed within the edge cloud 810 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 810 may provide the ability to serve and respond to multiple applications of the use cases 905 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 810 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 810 (network layers 900-940), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 810.

As such, the edge cloud 810 is formed from network components and functional features operated by and within edge gateway nodes, edge aggregation nodes, or other edge compute nodes among network layers 910-930. The edge cloud 810 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 810 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 810 may be servers, multi-tenant servers, appliance computing devices, or any other type of computing devices. For example, the edge cloud 810 may include an appliance computing device that is a self-contained electronic device including a housing, a chassis, a case or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 13B. The edge cloud 810 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code or scripts.

Figure 10:
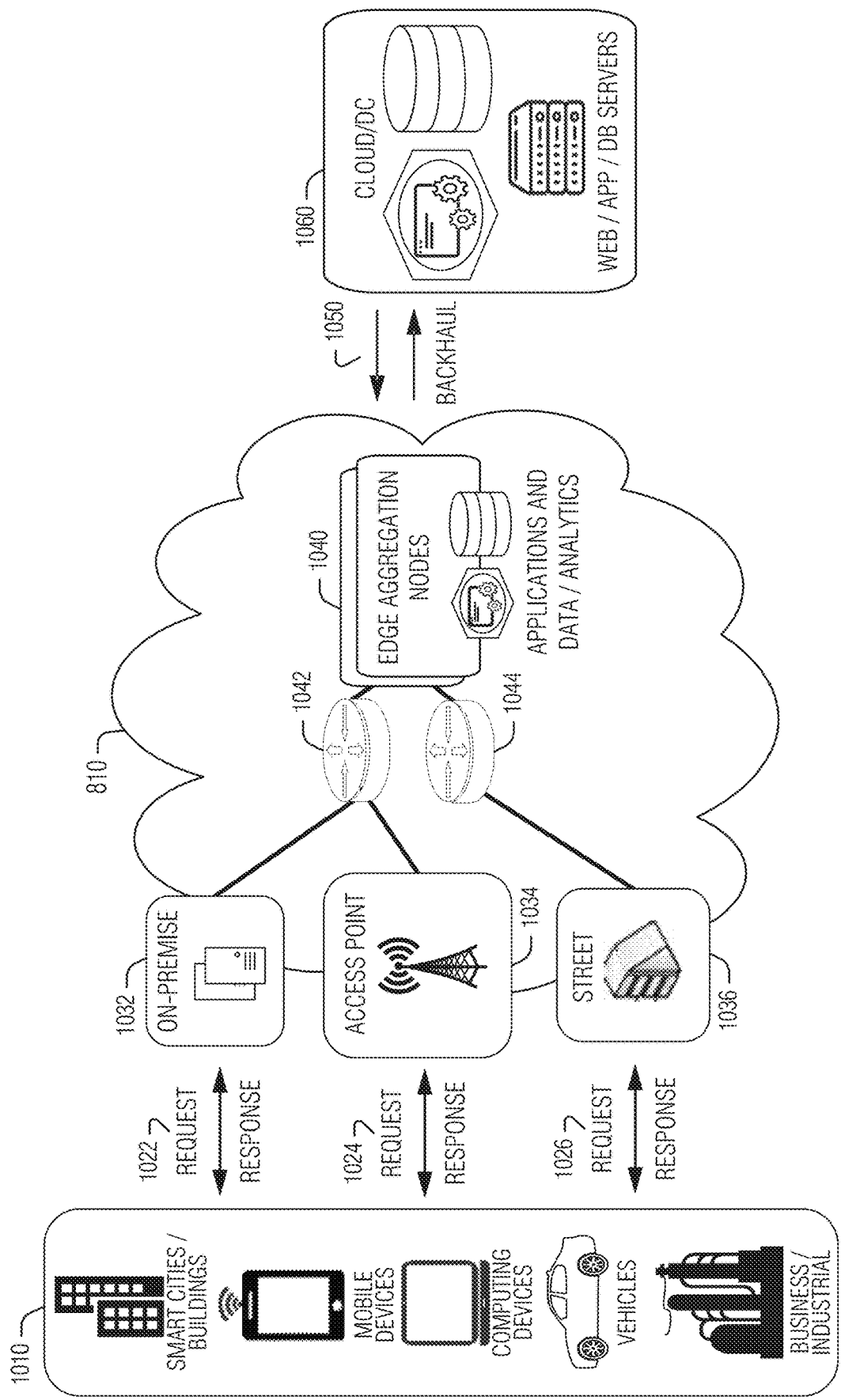
FIG. 10 illustrates an example approach for networking and services in an edge computing system.

In FIG. 10, various client endpoints 1010 (in the form of mobile devices, computers, autonomous vehicles, business computing equipment, industrial processing equipment) exchange requests and responses that are specific to the type of endpoint network aggregation. For instance, client endpoints 1010 may obtain network access via a wired broadband network, by exchanging requests and responses 1022 through an on-premise network system 1032. Some client endpoints 1010, such as mobile computing devices, may obtain network access via a wireless broadband network, by exchanging requests and responses 1024 through an access point (e.g., cellular network tower) 1034. Some client endpoints 1010, such as autonomous vehicles may obtain network access for requests and responses 1026 via a wireless vehicular network through a street-located network system 1036. However, regardless of the type of network access, the TSP may deploy aggregation points 1042, 1044 within the edge cloud 810 to aggregate traffic and requests. Thus, within the edge cloud 810, the TSP may deploy various compute and storage resources, such as at edge aggregation nodes 1040, to provide requested content. The edge aggregation nodes 1040 and other systems of the edge cloud 810 are connected to a cloud or data center 1060, which uses a backhaul network 1050 to fulfill higher-latency requests from a cloud/data center for websites, applications, database servers, etc. Additional or consolidated instances of the edge aggregation nodes 1040 and the aggregation points 1042, 1044, including those deployed on a single server framework, may also be present within the edge cloud 810 or other areas of the TSP infrastructure.

Figure 11:
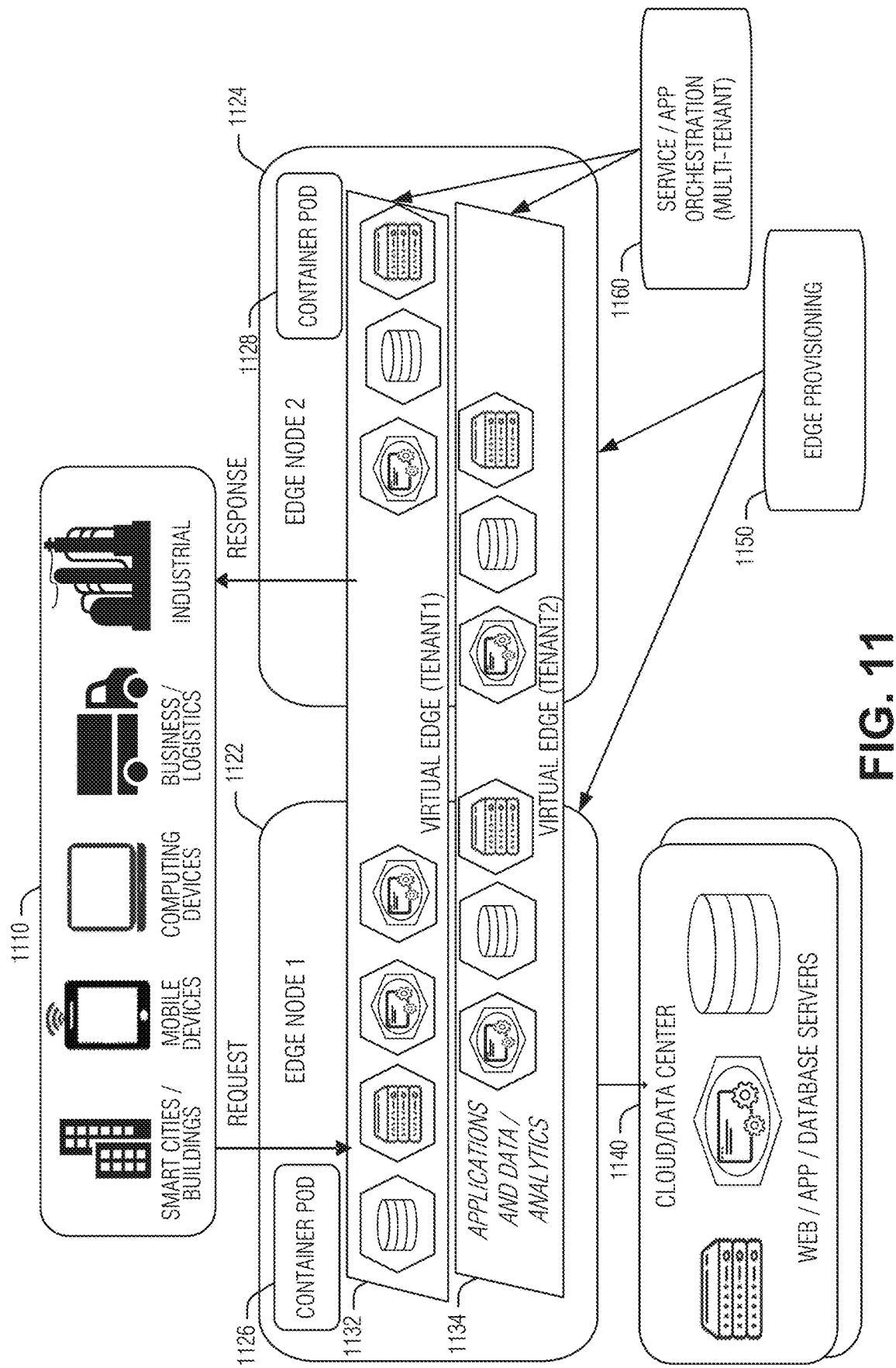
FIG. 11 illustrates deployment of a virtual edge configuration in an edge computing system operated among multiple edge nodes and multiple tenants.

FIG. 11 illustrates deployment and orchestration for virtualized and container-based edge configurations across an edge computing system operated among multiple edge nodes and multiple tenants (e.g., users, providers) which use such edge nodes. Specifically, FIG. 11 depicts coordination of a first edge node 1122 and a second edge node 1124 in an edge computing system, to fulfill requests and responses for various client endpoints 1110 (e.g., smart cities/building systems, mobile devices, computing devices, business/logistics systems, industrial systems, etc.), which access various virtual edge instances. Here, the virtual edge instances 1132, 1134 provide edge compute capabilities and processing in an edge cloud, with access to a cloud/data center 1140 for higher-latency requests for websites, applications, database servers, etc. However, the edge cloud enables coordination of processing among multiple edge nodes for multiple tenants or entities.

In the example of FIG. 11, these virtual edge instances include: a first virtual edge 1132, offered to a first tenant (Tenant 1), which offers a first combination of edge storage, computing, and services; and a second virtual edge 1134, offering a second combination of edge storage, computing, and services. The virtual edge instances 1132, 1134 are distributed among the edge nodes 1122, 1124, and may include scenarios in which a request and response are fulfilled from the same or different edge nodes. The configuration of the edge nodes 1122, 1124 to operate in a distributed yet coordinated fashion occurs based on edge provisioning functions 1150. The functionality of the edge nodes 1122, 1124 to provide coordinated operation for applications and services, among multiple tenants, occurs based on orchestration functions 1160.

It should be understood that some of the devices in 1110 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1122, 1124 may operate as security feature enforcement points for local resources allocated to multiple tenants per node. Additionally, tenant runtime and application execution (e.g., in instances 1132, 1134) may serve as an enforcement point for a security feature that creates a virtual edge abstraction of resources spanning potentially multiple physical hosting platforms. Finally, the orchestration functions 1160 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1110, 1122, and 1140 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 11. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1122, 1124 may implement the use of containers, such as with the use of a container "pod" 1126, 1128 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1132, 1134 are partitioned according to the needs of each container.

With the use of container pods, a pod controller oversees the partitioning and allocation of containers and resources. The pod controller receives instructions from an orchestrator (e.g., orchestrator 1160) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1160 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 12:
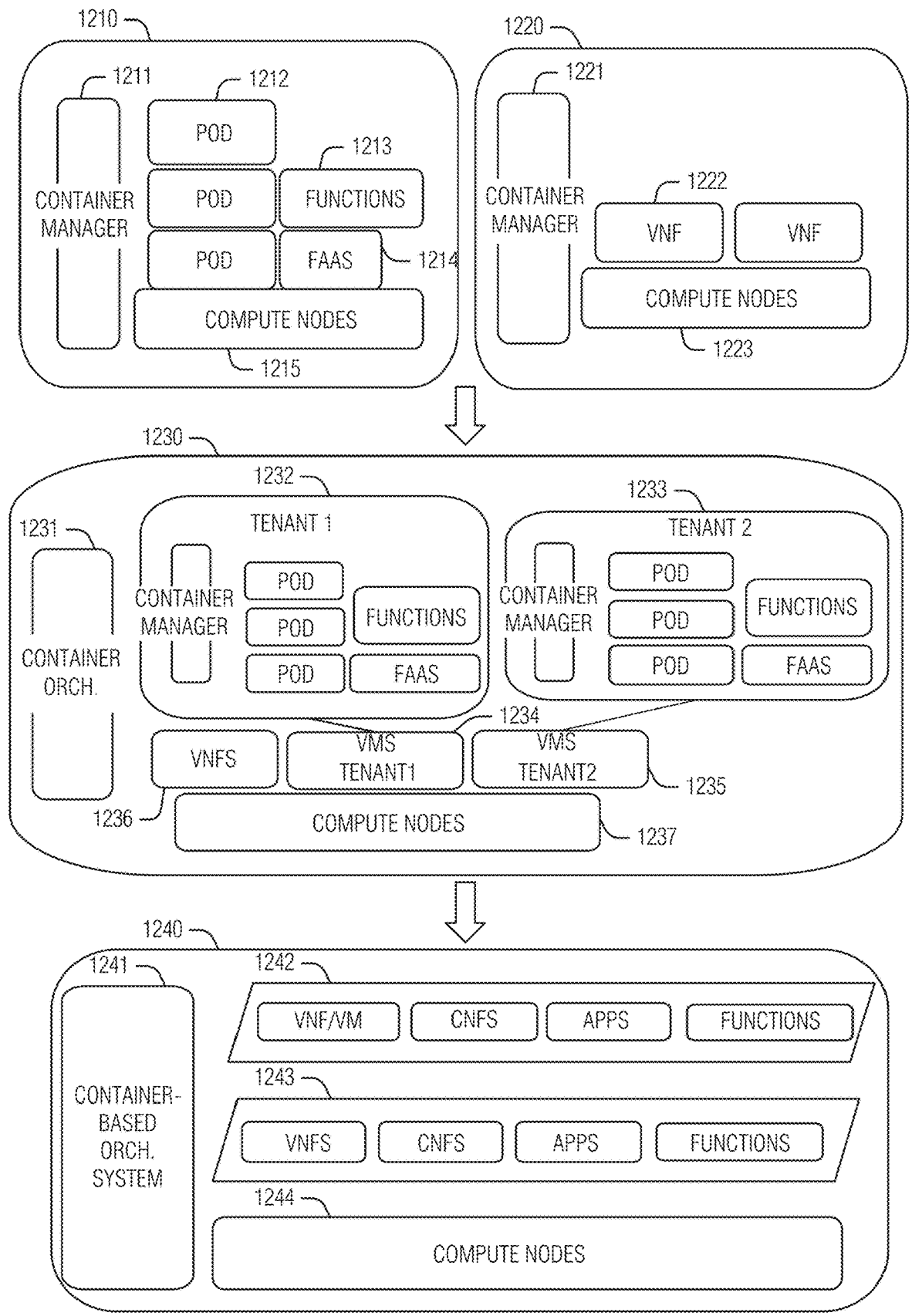
FIG. 12 illustrates various compute arrangements deploying containers in an edge computing system.

FIG. 12 illustrates additional compute arrangements deploying containers in an edge computing system. As a simplified example, system arrangements 1210, 1220 depict settings in which a pod controller (e.g., container managers 1211, 1221, and container orchestrator 1231) is adapted to launch containerized pods, functions, and functions-as-a-service instances through execution via compute nodes (1215 in arrangement 1210), or to separately execute containerized virtualized network functions through execution via compute nodes (1223 in arrangement 1220). This arrangement is adapted for use of multiple tenants in system arrangement 1230 (using compute nodes 1237), where containerized pods (e.g., pods 1212), functions (e.g., functions 1213, VNFs 1222, 1236), and functions-as-a-service instances (e.g., FaaS instance 1214) are launched within virtual machines (e.g., VMs 1234, 1235 for tenants 1232, 1233) specific to respective tenants (aside the execution of virtualized network functions). This arrangement is further adapted for use in system arrangement 1240, which provides containers 1242, 1243, or execution of the various functions, applications, and functions on compute nodes 1244, as coordinated by an container-based orchestration system 1241.

The system arrangements of depicted in FIG. 12 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 12, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 13A and 13B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 13A:
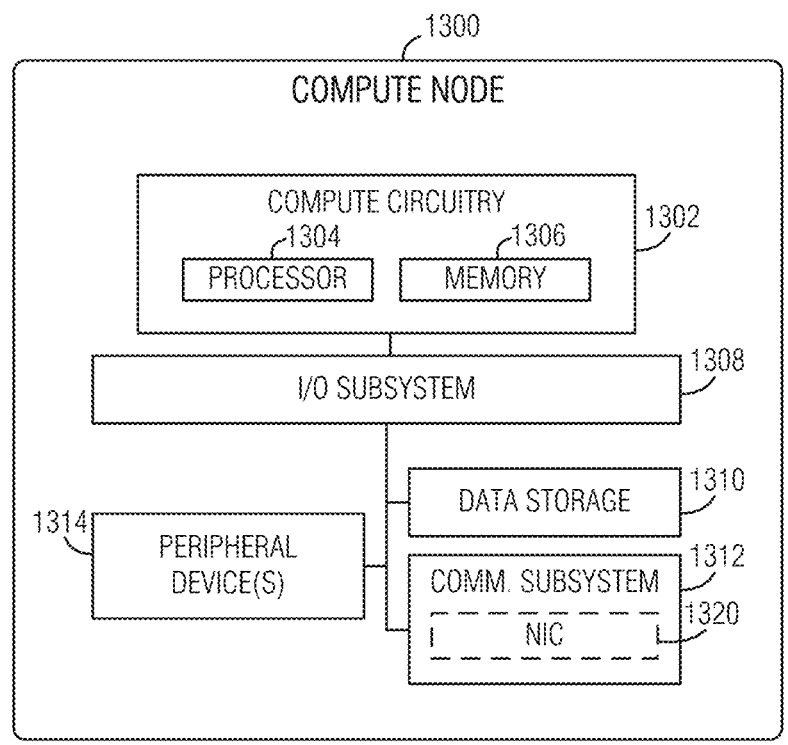
FIG. 13A provides an overview of example components for compute deployed at a compute node in an edge computing system.

In the simplified example depicted in FIG. 13A, an edge compute node 1300 includes a compute engine (also referred to herein as "compute circuitry") 1302, an input/output (I/O) subsystem 1308, data storage 1310, a communication circuitry subsystem 1312, and, optionally, one or more peripheral devices 1314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1300 may be embodied as any type of engine, device, or collection of devices capable of performing various compute functions. In some examples, the compute node 1300 may be embodied as a single device such as an integrated circuit, an embedded system, a field-programmable gate array (FPGA), a system-on-a-chip (SOC), or other integrated system or device. In the illustrative example, the compute node 1300 includes or is embodied as a processor 1304 and a memory 1306. The processor 1304 may be embodied as any type of processor capable of performing the functions described herein (e.g., executing an application). For example, the processor 1304 may be embodied as a multi-core processor(s), a microcontroller, a processing unit, a specialized or special purpose processing unit, or other processor or processing/controlling circuit.

In some examples, the processor 1304 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1304 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1304 may work in coordination with each other to execute many types of operations and instructions within and on behalf of the compute node 1300.

The memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1306 may be integrated into the processor 1304. The memory 1306 may store various software and data used during operation such as one or more applications, data operated on by the application(s), libraries, and drivers.

The compute circuitry 1302 is communicatively coupled to other components of the compute node 1300 via the I/O subsystem 1308, which may be embodied as circuitry or components to facilitate input/output operations with the compute circuitry 1302 (e.g., with the processor 1304 or the main memory 1306) and other components of the compute circuitry 1302. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1308 may form a portion of a system-on-a-chip (SoC) and be incorporated, along with one or more of the processor 1304, the memory 1306, and other components of the compute circuitry 1302, into the compute circuitry 1302.

The one or more illustrative data storage devices 1310 may be embodied as any type of devices configured for short-term or long-term storage of data such as, for example, memory devices and circuits, memory cards, hard disk drives, solid-state drives, or other data storage devices. Individual data storage devices 1310 may include a system partition that stores data and firmware code for the data storage device 1310. Individual data storage devices 1310 may also include one or more operating system partitions that store data files and executables for operating systems depending on, for example, the type of compute node 1300.

The communication circuitry 1312 may be embodied as any communication circuit, device, or collection thereof, capable of enabling communications over a network between the compute circuitry 1302 and another compute device (e.g., an edge gateway of an implementing edge computing system). The communication circuitry 1312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1312 includes a network interface controller (NIC) 1320, which may also be referred to as a host fabric interface (HFI). The NIC 1320 may be embodied as one or more add-in-boards, daughter cards, network interface cards, controller chips, chipsets, or other devices that may be used by the compute node 1300 to connect with another compute device (e.g., an edge gateway node). In some examples, the NIC 1320 may be embodied as part of a system-on-a-chip (SoC) that includes one or more processors, or included on a multichip package that also contains one or more processors. In some examples, the NIC 1320 may include a local processor (not shown) or a local memory (not shown) that are both local to the NIC 1320. In such examples, the local processor of the NIC 1320 may be capable of performing one or more of the functions of the compute circuitry 1302 described herein. Additionally, or alternatively, in such examples, the local memory of the NIC 1320 may be integrated into one or more components of the client compute node at the board level, socket level, chip level, or other levels.

Additionally, in some examples, a respective compute node 1300 may include one or more peripheral devices 1314. Such peripheral devices 1314 may include any type of peripheral device found in a compute device or server such as audio input devices, a display, other input/output devices, interface devices, or other peripheral devices, depending on the particular type of the compute node 1300. In further examples, the compute node 1300 may be embodied by a respective edge compute node (whether a client, gateway, or aggregation node) in an edge computing system or like forms of appliances, computers, subsystems, circuitry, or other components.

Figure 13B:
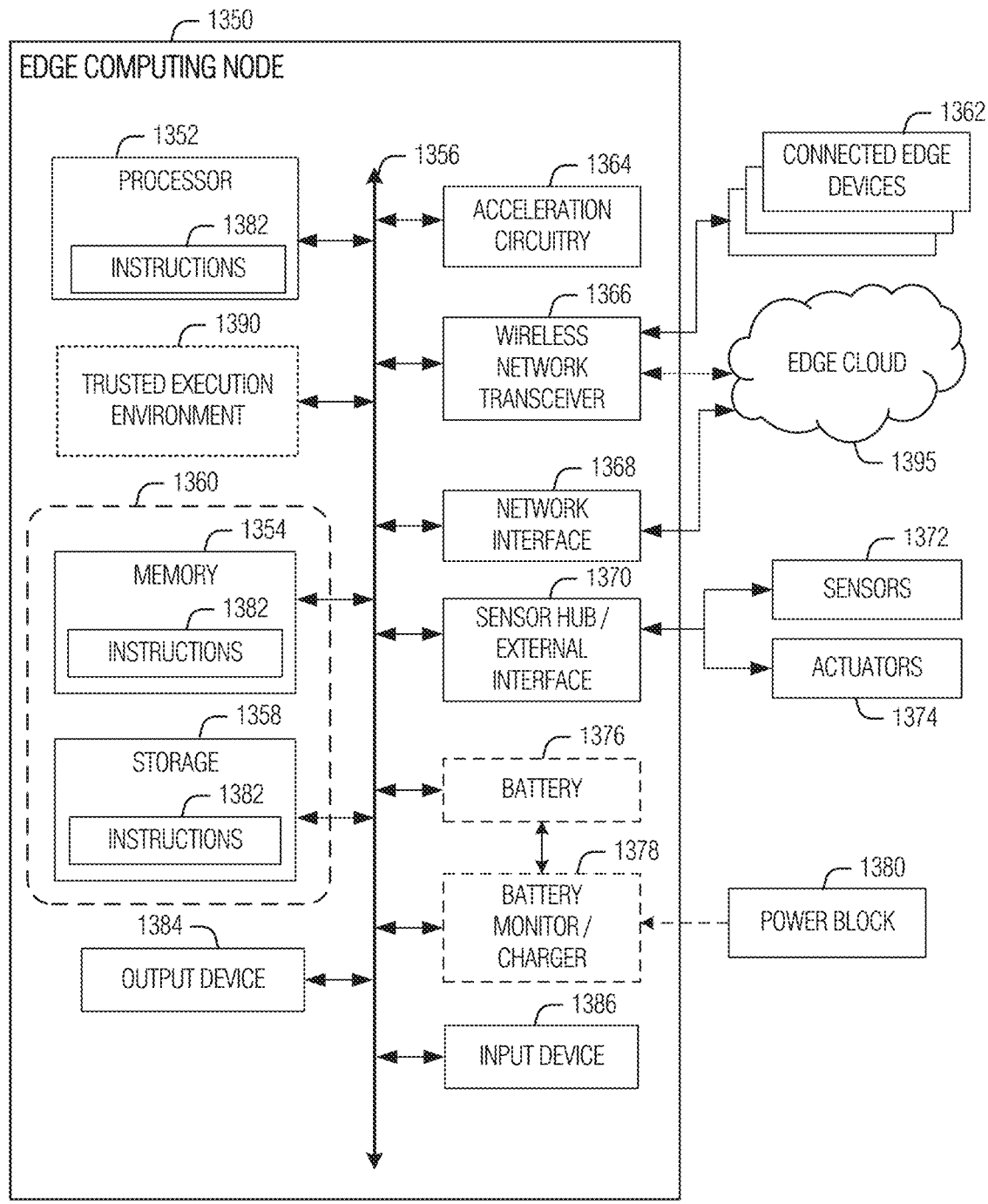
FIG. 13B provides a further overview of example components within a computing device in an edge computing system.

In a more detailed example, FIG. 13B illustrates a block diagram of an example of components that may be present in an edge computing node 1350 for implementing the techniques (e.g., operations, processes, methods, and methodologies) described herein. This edge computing node 1350 provides a closer view of the respective components of node 1300 when implemented as or as part of a computing device (e.g., as a mobile device, a base station, server, gateway, etc.). The edge computing node 1350 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1350, or as components otherwise incorporated within a chassis of a larger system.

The edge computing device 1350 may include processing circuitry in the form of a processor 1352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1352 may be a part of a system on a chip (SoC) in which the processor 1352 and other components are formed into a single integrated circuit, or a single package, such as the Edison™ or Galileo™ SoC boards from Intel Corporation, Santa Clara, California As an example, the processor 1352 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1352 and accompanying circuitry may be provided in a single socket form factor, multiple socket form factor, or a variety of other formats, including in limited hardware configurations or configurations that include fewer than all elements shown in FIG. 13B.

The processor 1352 may communicate with a system memory 1354 over an interconnect 1356 (e.g., a bus). Any number of memory devices may be used to provide for a given amount of system memory. As examples, the memory 1354 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example, the storage 1358 may be implemented via a solid-state disk drive (SSDD). Other devices that may be used for the storage 1358 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1356 may couple the processor 1352 to a transceiver 1366, for communications with the connected edge devices 1362. The transceiver 1366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the edge computing node 1350 may communicate with close devices, e.g., within about 10 meters, using a local transceiver based on Bluetooth Low Energy (BLE), or another low power radio, to save power. More distant connected edge devices 1362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in a cloud (e.g., an edge cloud 1395) via local or wide area network protocols. The wireless network transceiver 1366 may be a low-power wide-area (LPWA) transceiver that follows the IEEE 802.15.4, or IEEE 802.15.4g standards, among others. The edge computing node 1350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1368 may be included to provide a wired communication to nodes of the edge cloud 1395 or to other devices, such as the connected edge devices 1362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional MC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The edge computing node 1350 may include or be coupled to acceleration circuitry 1364, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1356 may couple the processor 1352 to a sensor hub or external interface 1370 that is used to connect additional devices or subsystems. The devices may include sensors 1372, such as accelerometers, level sensors, flow sensors, optical light sensors, camera sensors, temperature sensors, global navigation system (e.g., GPS) sensors, pressure sensors, barometric pressure sensors, and the like. The hub or interface 1370 further may be used to connect the edge computing node 1350 to actuators 1374, such as power switches, valve actuators, an audible sound generator, a visual warning device, and the like.

In some optional examples, various input/output (I/O) devices may be present within or connected to, the edge computing node 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the edge computing node 1350, although, in examples in which the edge computing node 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the edge computing node 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1378 may communicate the information on the battery 1376 to the processor 1352 over the interconnect 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the edge computing node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the edge computing node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine-readable medium 1360 including code to direct the processor 1352 to perform electronic operations in the edge computing node 1350. The processor 1352 may access the non-transitory, machine-readable medium 1360 over the interconnect 1356. For instance, the non-transitory, machine-readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram (s) of operations and functionality depicted above. As used herein, the terms "machine-readable medium" and "computer-readable medium" are interchangeable. Also in a specific example, the instructions 1382 on the processor 1352 (separately, or in combination with the instructions 1382 of the machine readable medium 1360) may configure execution or operation of a trusted execution environment (TEE) 1390. In an example, the TEE 1390 operates as a protected area accessible to the processor 1352 for secure execution of instructions and secure access to data. Various implementations of the TEE 1390, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352.

Figure 14:
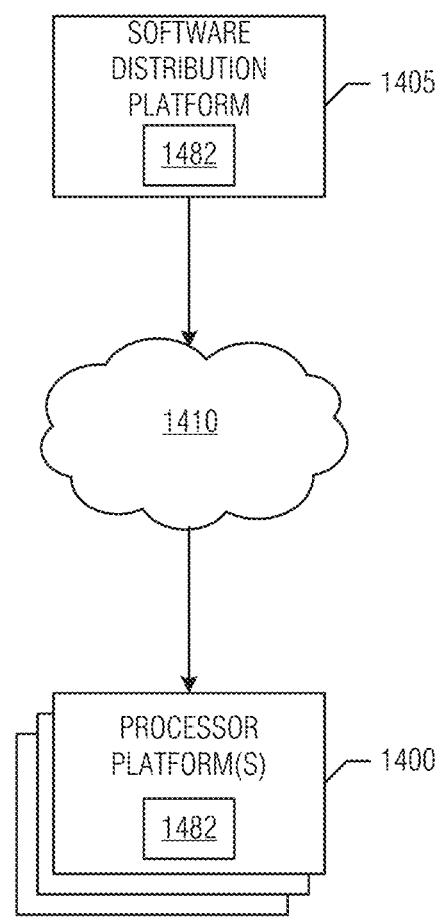
FIG. 14 illustrates an example software distribution platform to distribute software.

FIG. 14 illustrates an example software distribution platform 1405 to distribute software, such as the example computer readable instructions 1482 of FIG. 14, to one or more devices, such as example processor platform(s) 1400 or connected edge devices. The example software distribution platform 1405 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1405). Example connected edge devices may operate in commercial or home automation environments. In some examples, a third party is a developer, a seller, or a licensor of software such as the example computer readable instructions 1482 of FIG. 14. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 14, the software distribution platform 1405 includes one or more servers and one or more storage devices. The storage devices store the computer readable instructions 1482, which may correspond to the example computer readable instructions illustrated in the figures and described herein. The one or more servers of the example software distribution platform 1405 are in communication with a network 1410, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1482 from the software distribution platform 1405. For example, the software, which may correspond to the example computer readable instructions described herein, may be downloaded to the example processor platform(s) 1400 (e.g., example connected edge devices), which are to execute the computer readable instructions 1482 to implement the technique. In some examples, one or more servers of the software distribution platform 1405 are communicatively connected to one or more security domains or security devices through which requests and transmissions of the example computer readable instructions 1482 must pass. In some examples, one or more servers of the software distribution platform 1405 periodically offer, transmit, or force updates to the software (e.g., the example computer readable instructions 1482 of FIG. 14) to ensure improvements, patches, updates, etc. are distributed and applied to the software at the end user devices.

In the illustrated example of FIG. 14, the computer readable instructions 1482 are stored on storage devices of the software distribution platform 1405 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 1482 stored in the software distribution platform 1405 are in a first format when transmitted to the example processor platform (s) 1400. In some examples, the first format is an executable binary in which particular types of the processor platform(s) 1400 can execute. However, in some examples, the first format is uncompiled code that requires one or more preparation tasks to transform the first format to a second format to enable execution on the example processor platform(s) 1400. For instance, the receiving processor platform(s) 1400 may need to compile the computer readable instructions 1482 in the first format to generate executable code in a second format that is capable of being executed on the processor platform(s) 1400. In still other examples, the first format is interpreted code that, upon reaching the processor platform(s) 1400, is interpreted by an interpreter to facilitate execution of instructions.

Figure 15:
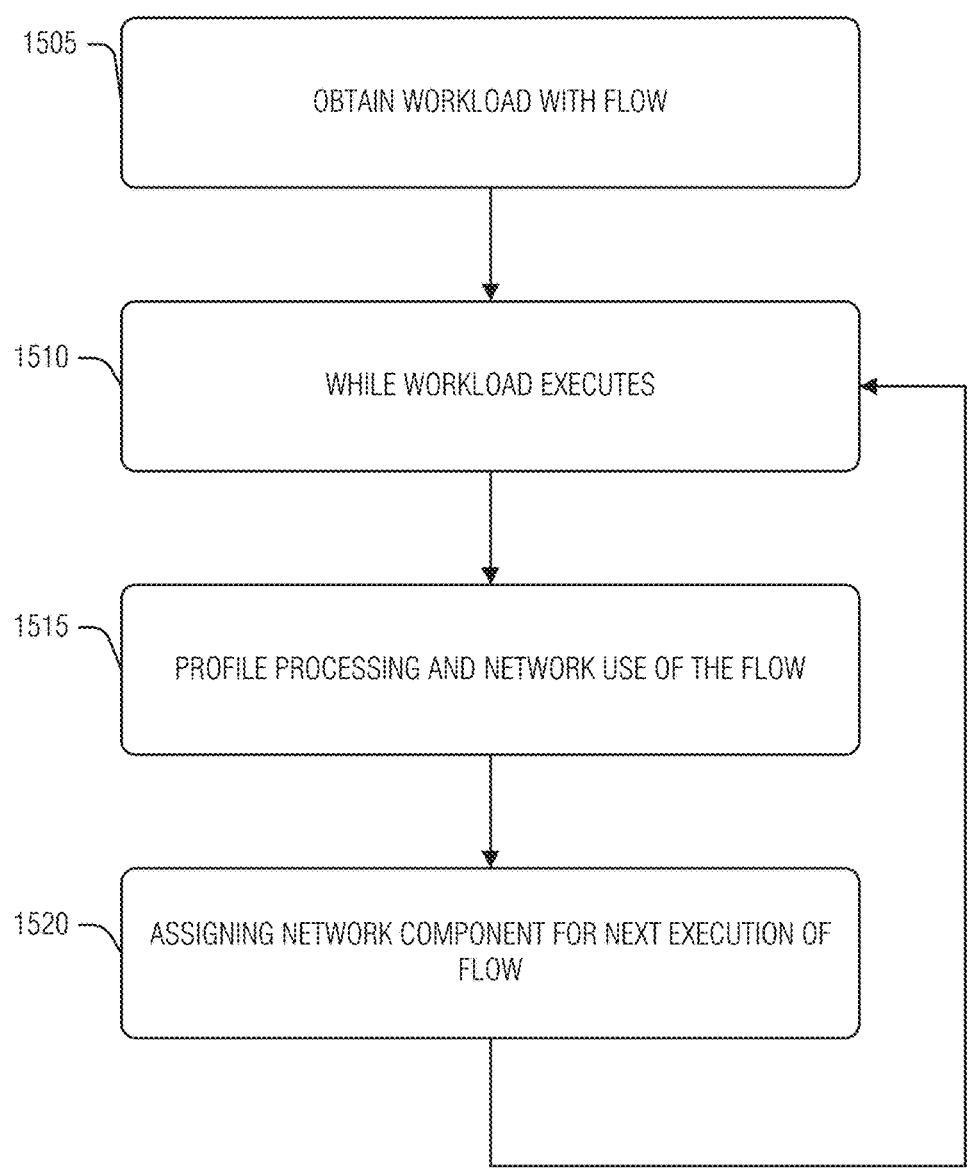
FIG. 15 illustrates a flow diagram of an example of a method for network flow-based hardware allocation, according to an embodiment.

FIG. 15 illustrates a flow diagram of an example of a method 1500 for network flow-based hardware allocation, according to an embodiment. The operations of the method 1500 are performed by computational hardware, such as that described above or below (e.g., processing circuitry).

At operation 1505, a workload is obtained for execution. Here, the workload includes a flow. The flow includes a processing component and a network component.

At operation 1510, the workload is executed. During execution of the workload, operations 1515 and 1520 are repeated until the workload terminates.

At operation 1515, the flow is profiled to determine a network metric for the network component and a processing metric for the processing component. In an example, the profiling is performed at a predefined time interval. In an example, the profiling is performed in response to an event. In an example, the profiling is performed, or upon receipt of a query concerning the flow or the workload.

In an example, the profiling includes tagging a communication of the flow using the network service with an identification. The identification may then be mapped to the flow. In an example, the identification is a tuple that includes a source address, a source port, a destination port, or communication type.

In an example, the profiling updates an interface profile and ranking database. In an example, an entry in the interface profile and ranking database is thirty-bits in length. In an example, interfaces are ranked in the interface profile and ranking database by flow. Here, assigning the network service and the processing service to the flow in a next execution based on the network metric and the processing metric includes selecting an interface with a highest rank for the flow. In an example, the interfaces are ranked based on a combination of the flow and a processing service selected for the flow.

At operation 1520, a network service and a processing service are assigned to the flow in a next execution based on the network metric and the processing metric. In an example, the network service is a network interface card (NIC). In an example, the network service is a channel or a virtual channel. In an example, the network service or the processing service are hardware partitions.

In an example, assigning the network service based on the network metric includes selecting a network service that includes a minimum network metric to meet the network component of the flow. In an example, the network metric is bandwidth or latency.

In an example, assigning the network service and the processing service includes selecting a network service that includes a minimum network metric to meet a maximum output related to the network metric of the processing service.

Figure 16:
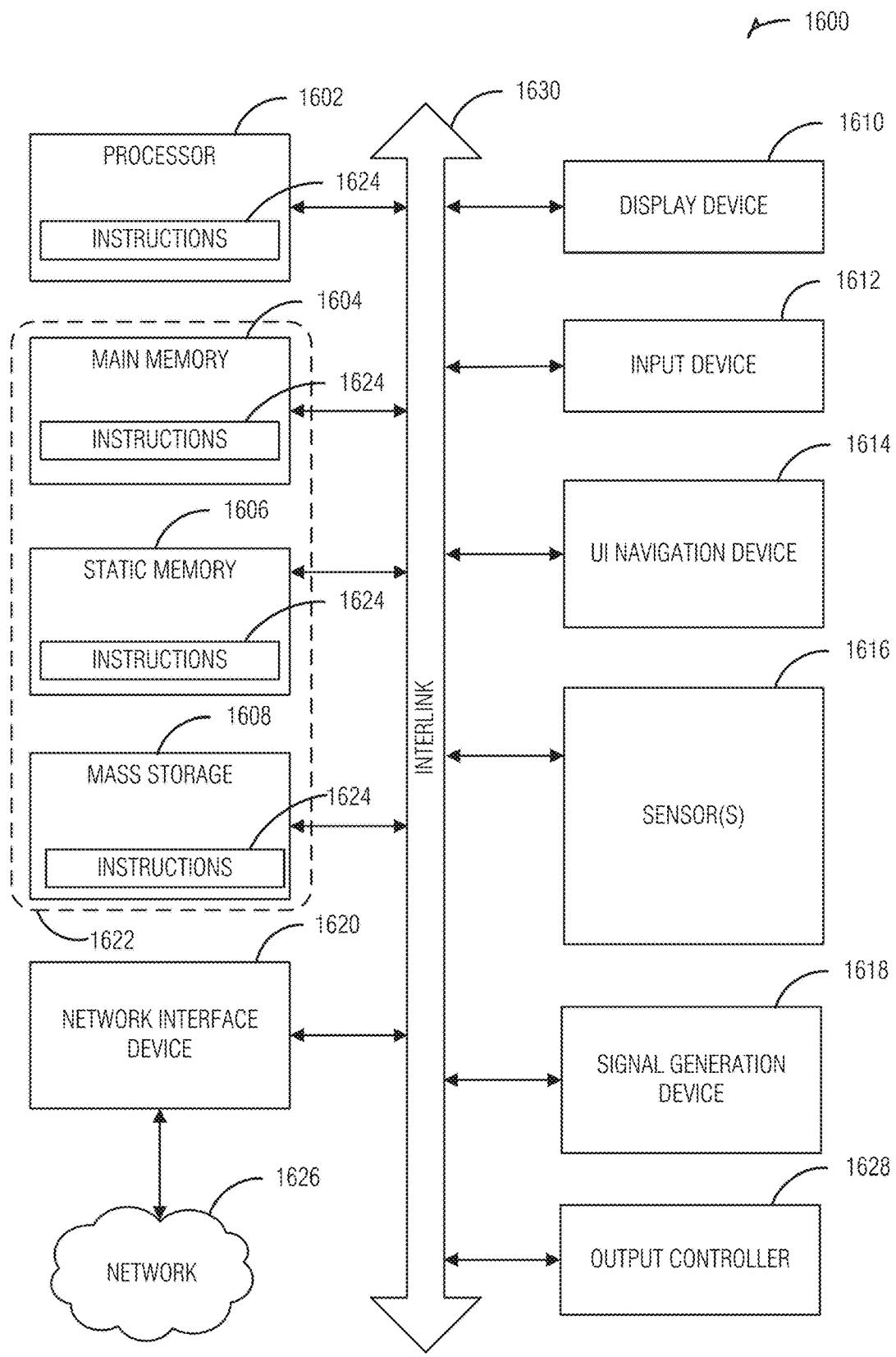
FIG. 16 is a block diagram illustrating an example of a machine upon which one or more embodiments may be implemented.

FIG. 16 illustrates a block diagram of an example machine 1600 upon which any one or more of the techniques (e.g., methodologies) discussed herein may perform. Examples, as described herein, may include, or may operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1600 follow.

In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1600 may include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drives, tape drives, flash storage, or other block devices) some or all of which may communicate with each other via an interlink (e.g., bus) 1630. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1608, a signal generation device 1618 (e.g., a speaker), a network interface device 1620, and one or more sensors 1616, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 may be, or include, a machine readable medium 1622 on which is stored one or more sets of data structures or instructions 1624 (e.g., software) embodying or utilized by any one or more of the techniques or functions described herein. The instructions 1624 may also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 may constitute the machine readable media 1622. While the machine readable medium 1622 is illustrated as a single medium, the term "machine readable medium" may include a single medium or multiple media (e.g., a centralized or distributed database, or associated caches and servers) configured to store the one or more instructions 1624.

The term "machine readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1622 may be representative of the instructions 1624, such as instructions 1624 themselves or a format from which the instructions 1624 may be derived. This format from which the instructions 1624 may be derived may include source code, encoded instructions (e.g., in compressed or encrypted form), packaged instructions (e.g., split into multiple packages), or the like. The information representative of the instructions 1624 in the machine readable medium 1622 may be processed by processing circuitry into the instructions to implement any of the operations discussed herein. For example, deriving the instructions 1624 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1624.

In an example, the derivation of the instructions 1624 may include assembly, compilation, or interpretation of the information (e.g., by the processing circuitry) to create the instructions 1624 from some intermediate or preprocessed format provided by the machine readable medium 1622. The information, when provided in multiple parts, may be combined, unpacked, and modified to create the instructions 1624. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1624 may be further transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software. A transmission medium is a machine readable medium.

Additional Notes & Examples

Example 1 is an apparatus for network flow-based hardware allocation, the apparatus comprising: machine readable media including instructions; and processing circuitry that, when in operation, is configured by the instructions to: obtain a workload for execution, the workload including a flow, the flow including a processing component and a network component; and during execution of the workload, repeatedly: profile the flow upon execution to determine a network metric for the network component and a processing metric for the processing component; and assign a network service and a processing service to the flow in a next execution based on the network metric and the processing metric.

In Example 2, the subject matter of Example 1, wherein the network service is a network interface card (NIC).

In Example 3, the subject matter of any of Examples 1-2, wherein the network service is a channel, a virtual channel, or a bandwidth slice.

In Example 4, the subject matter of any of Examples 1-3, wherein, to assign the network service based on the network metric, the processing circuitry is configured to select a network service that includes a minimum network metric to meet the network component of the flow.

In Example 5, the subject matter of Example 4, wherein the network metric is bandwidth or latency.

In Example 6, the subject matter of any of Examples 1-5, wherein, to assign the network service and the processing service, the processing circuitry is configured to select a network service that includes a minimum network metric to meet a maximum output related to the network metric of the processing service.

In Example 7, the subject matter of any of Examples 1-6, wherein the network service or the processing service are hardware partitions.

In Example 8, the subject matter of any of Examples 1-7, wherein, to profile the flow, the processing circuitry is configured to: tag a communication of the flow using the network service with an identification; and map the identification to the flow.

In Example 9, the subject matter of Example 8, wherein the identification is a tuple that includes a source address, a source port, a destination port, or a communication type.

In Example 10, the subject matter of any of Examples 1-9, wherein the processing circuitry is configured to profile the flow at a predefined time interval, in response to an event, or upon receipt of a query.

In Example 11, the subject matter of any of Examples 1-10, wherein, to profile the flow, the processing circuitry is configured to update an interface-profile-and-ranking database.

In Example 12, the subject matter of Example 11, wherein an entry in the interface-profile-and-ranking-database is thirty-bits in length.

In Example 13, the subject matter of any of Examples 11-12, wherein interfaces are ranked in the interface profile and ranking database by flow, and wherein, to assign the network service and the processing service to the flow in the next execution based on the network metric and the processing metric, the processing circuitry is configured to select an interface with a highest rank for the flow.

In Example 14, the subject matter of Example 13, wherein the interfaces are ranked based on a combination of the flow and a processing service selected for the flow.

Example 15 is a method for network flow-based hardware allocation, the method comprising: obtaining a workload for execution, the workload including a flow, the flow including a processing component and a network component; and during execution of the workload, repeatedly: profiling the flow upon execution to determine a network metric for the network component and a processing metric for the processing component; and assigning a network service and a processing service to the flow in a next execution based on the network metric and the processing metric.

In Example 16, the subject matter of Example 15, wherein the network service is a network interface card (MC).

In Example 17, the subject matter of any of Examples 15-16, wherein the network service is a channel, a virtual channel, or a bandwidth slice.

In Example 18, the subject matter of any of Examples 15-17, wherein assigning the network service based on the network metric includes selecting a network service that includes a minimum network metric to meet the network component of the flow.

In Example 19, the subject matter of Example 18, wherein the network metric is bandwidth or latency.

In Example 20, the subject matter of any of Examples 15-19, wherein assigning the network service and the processing service includes selecting a network service that includes a minimum network metric to meet a maximum output related to the network metric of the processing service.

In Example 21, the subject matter of any of Examples 15-20, wherein the network service or the processing service are hardware partitions.

In Example 22, the subject matter of any of Examples 15-21, wherein the profiling includes: tagging a communication of the flow using the network service with an identification; and mapping the identification to the flow.

In Example 23, the subject matter of Example 22, wherein the identification is a tuple that includes a source address, a source port, a destination port, or a communication type.

In Example 24, the subject matter of any of Examples 15-23, wherein the profiling is performed at a predefined time interval, in response to an event, or upon receipt of a query.

In Example 25, the subject matter of any of Examples 15-24, wherein the profiling updates an interface-profile-and-ranking database.

In Example 26, the subject matter of Example 25, wherein an entry in the interface-profile-and-ranking-database is thirty-bits in length.

In Example 27, the subject matter of any of Examples 25-26, wherein interfaces are ranked in the interface profile and ranking database by flow, and wherein assigning network service and the processing service to the flow in the next execution based on the network metric and the processing metric includes selecting an interface with a highest rank for the flow.

In Example 28, the subject matter of Example 27, wherein the interfaces are ranked based on a combination of the flow and the processing service selected for the flow.

Example 29 is at least one machine readable medium including instructions for network flow-based hardware allocation, the instructions, when executed by processing circuitry, cause the processing circuitry to perform operations comprising: obtaining a workload for execution, the workload including a flow, the flow including a processing component and a network component; and during execution of the workload, repeatedly: profiling the flow upon execution to determine a network metric for the network component and a processing metric for the processing component; and assigning a network service and a processing service to the flow in a next execution based on the network metric and the processing metric.

In Example 30, the subject matter of Example 29, wherein the network service is a network interface card (MC).

In Example 31, the subject matter of any of Examples 29-30, wherein the network service is a channel, a virtual channel, or a bandwidth slice.

In Example 32, the subject matter of any of Examples 29-31, wherein assigning the network service based on the network metric includes selecting a network service that includes a minimum network metric to meet the network component of the flow.

In Example 33, the subject matter of Example 32, wherein the network metric is bandwidth or latency.

In Example 34, the subject matter of any of Examples 29-33, wherein assigning the network service and the processing service includes selecting the network service that includes a minimum network metric to meet a maximum output related to the network metric of the processing service.

In Example 35, the subject matter of any of Examples 29-34, wherein the network service or the processing service are hardware partitions.

In Example 36, the subject matter of any of Examples 29-35, wherein the profiling includes: tagging a communication of the flow using the network service with an identification; and mapping the identification to the flow.

In Example 37, the subject matter of Example 36, wherein the identification is a tuple that includes a source address, a source port, a destination port, or a communication type.

In Example 38, the subject matter of any of Examples 29-37, wherein the profiling is performed at a predefined time interval, in response to an event, or upon receipt of a query.

In Example 39, the subject matter of any of Examples 29-38, wherein the profiling updates an interface-profile-and-ranking database.

In Example 40, the subject matter of Example 39, wherein an entry in the interface-profile-and-ranking-database is thirty-bits in length.

In Example 41, the subject matter of any of Examples 39-40, wherein interfaces are ranked in the interface profile and ranking database by flow, and wherein assigning network service and the processing service to the flow in the next execution based on the network metric and the processing metric includes selecting an interface with a highest rank for the flow.

In Example 42, the subject matter of Example 41, wherein the interfaces are ranked based on a combination of the flow and a processing service selected for the flow.

Example 43 is a system for network flow-based hardware allocation, the system comprising: means for obtaining a workload for execution, the workload including a flow, the flow including a processing component and a network component; and during execution of the workload, means for repeatedly: applying means for profiling the flow upon execution to determine a network metric for the network component and a processing metric for the processing component; and applying means for assigning a network service and a processing service to the flow in a next execution based on the network metric and the processing metric.

In Example 44, the subject matter of Example 43, wherein the network service is a network interface card (MC).

In Example 45, the subject matter of any of Examples 43-44, wherein the network service is a channel, a virtual channel, or a bandwidth slice.

In Example 46, the subject matter of any of Examples 43-45, wherein the means for assigning the network service based on the network metric include means for selecting a network service that includes a minimum network metric to meet the network component of the flow.

In Example 47, the subject matter of Example 46, wherein the network metric is bandwidth or latency.

In Example 48, the subject matter of any of Examples 43-47, wherein the means for assigning the network service and the processing service include means for selecting a network service that includes a minimum network metric to meet a maximum output related to the network metric of the processing service.

In Example 49, the subject matter of any of Examples 43-48, wherein the network service or the processing service are hardware partitions.

In Example 50, the subject matter of any of Examples 43-49, wherein the means for profiling include: means for tagging a communication of the flow using the network service with an identification; and means for mapping the identification to the flow.

In Example 51, the subject matter of Example 50, wherein the identification is a tuple that includes a source address, a source port, a destination port, or a communication type.

In Example 52, the subject matter of any of Examples 43-51, wherein the profiling is performed at a predefined time interval, in response to an event, or upon receipt of a query.

In Example 53, the subject matter of any of Examples 43-52, wherein the profiling updates an interface-profile-and-ranking database.

In Example 54, the subject matter of Example 53, wherein an entry in the interface-profile-and-ranking-database is thirty-bits in length.

In Example 55, the subject matter of any of Examples 53-54, wherein interfaces are ranked in the interface profile and ranking database by flow, and wherein the means for assigning network service and the processing service to the flow in the next execution based on the network metric and the processing metric include means for selecting an interface with a highest rank for the flow.

In Example 56, the subject matter of Example 55, wherein the interfaces are ranked based on a combination of the flow and a processing service selected for the flow.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for network flow-based hardware allocation, the apparatus comprising:
at least one machine readable medium including instructions; and
processing circuitry that, when in operation, is configured by the instructions to:
obtain a workload for execution, the workload including a flow, the flow including a processing component and a network component; and
during execution of the workload, repeatedly:
profile the flow upon execution to determine a network metric for the network component and a processing metric for the processing component; and
assign a network service and a processing service to the flow in a next execution based on the network metric and the processing metric.

2. The apparatus of claim 1, wherein the network service is a channel, a virtual channel, or a bandwidth slice.

3. The apparatus of claim 1, wherein, to assign the network service and the processing service, the processing circuitry is configured to select a network service that includes a minimum network metric to meet a maximum output related to the network metric of the processing service.

4. The apparatus of claim 1, wherein, to profile the flow, the processing circuitry is configured to:
tag a communication of the flow using the network service with an identification; and
map the identification to the flow.

5. The apparatus of claim 1, wherein, to profile the flow, the processing circuitry is configured to update an interface-profile-and-ranking database.

6. The apparatus of claim 5, wherein an entry in the interface-profile-and-ranking database is thirty-bits in length.

7. The apparatus of claim 5, wherein interfaces are ranked in the interface profile and ranking database interface-profile-and-ranking database by flow, and wherein, to assign the network service and the processing service to the flow in the next execution based on the network metric and the processing metric, the processing circuitry is configured to select an interface with a highest rank for the flow.

8. The apparatus of claim 7, wherein the interfaces are ranked based on a combination of the flow and a processing service selected for the flow.

9. A method for network flow-based hardware allocation, the method comprising:
obtaining a workload for execution, the workload including a flow, the flow including a processing component and a network component; and
during execution of the workload, repeatedly:
profiling the flow upon execution to determine a network metric for the network component and a processing metric for the processing component; and
assigning a network service and a processing service to the flow in a next execution based on the network metric and the processing metric.

10. The method of claim 9, wherein the network service is a channel, a virtual channel, or a bandwidth slice.

11. The method of claim 9, wherein assigning the network service and the processing service includes selecting a network service that includes a minimum network metric to meet a maximum output related to the network metric of the processing service.

12. The method of claim 9, wherein the profiling includes:
tagging a communication of the flow using the network service with an identification; and
mapping the identification to the flow.

13. The method of claim 9, wherein the profiling updates an interface-profile-and-ranking database.

14. The method of claim 13, wherein an entry in the interface-profile-and-ranking database is thirty-bits in length.

15. The method of claim 13, wherein interfaces are ranked in the interface-profile-and-ranking database by flow, and wherein assigning network service and the processing service to the flow in the next execution based on the network metric and the processing metric includes selecting an interface with a highest rank for the flow.

16. The method of claim 15, wherein the interfaces are ranked based on a combination of the flow and the processing service selected for the flow.

17. At least one non-transitory machine readable medium including instructions for network flow-based hardware allocation, the instructions, when executed by processing circuitry, cause the processing circuitry to perform operations comprising:
obtaining a workload for execution, the workload including a flow, the flow including a processing component and a network component; and
during execution of the workload, repeatedly:
profiling the flow upon execution to determine a network metric for the network component and a processing metric for the processing component; and
assigning a network service and a processing service to the flow in a next execution based on the network metric and the processing metric.

18. The at least one non-transitory machine readable medium of claim 17, wherein the network service is a channel, a virtual channel, or a bandwidth slice.

19. The at least one non-transitory machine readable medium of claim 17, wherein assigning the network service and the processing service includes selecting the network service that includes a minimum network metric to meet a maximum output related to the network metric of the processing service.

20. The at least one non-transitory machine readable medium of claim 17, wherein the profiling includes:
tagging a communication of the flow using the network service with an identification; and
mapping the identification to the flow.

21. The at least one non-transitory machine readable medium of claim 17, wherein the profiling updates an interface-profile-and-ranking database.

22. The at least one non-transitory machine readable medium of claim 21, wherein an entry in the interface-profile-and-ranking database is thirty-bits in length.

23. The at least one non-transitory machine readable medium of claim 21, wherein interfaces are ranked in the interface-profile-and-ranking database by flow, and wherein assigning network service and the processing service to the flow in the next execution based on the network metric and the processing metric includes selecting an interface with a highest rank for the flow.

24. The at least one non-transitory machine readable medium of claim 23, wherein the interfaces are ranked based on a combination of the flow and a processing service selected for the flow.

\* \* \* \* \*